(12) United States Patent
Hammerschmidt

(10) Patent No.: US 7,636,401 B2
(45) Date of Patent: Dec. 22, 2009

(54) METHODS AND SYSTEMS FOR SOFT-BIT DEMAPPING

(75) Inventor: Joachim Hammerschmidt, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 560 days.

(21) Appl. No.: 11/498,833

(22) Filed: Aug. 4, 2006

(65) Prior Publication Data
US 2007/0036245 A1    Feb. 15, 2007

Related U.S. Application Data

(60) Provisional application No. 60/707,524, filed on Aug. 12, 2005.

(51) Int. Cl.
*H04B 7/02*    (2006.01)
*H04L 1/02*    (2006.01)

(52) U.S. Cl. ................. 375/267; 375/229; 375/231; 375/232; 375/233; 375/299; 375/347

(58) Field of Classification Search ................. 375/267, 375/299, 347, 229, 231, 232, 233
See application file for complete search history.

(56) References Cited

U.S. PATENT DOCUMENTS 7,117,353 B2 * 10/2006 Natu et al. ................. 713/2
7,257,172 B2 * 8/2007 Okamoto et al. ............ 375/341
7,349,495 B2 * 3/2008 Krupka ....................... 375/340
2007/0036246 A1   2/2007 Hammerschmidt

OTHER PUBLICATIONS

Tosato and Bisaglia, "Simplified Soft-Output Demapper for Binary Interleaved COFDM with Application to HIPERLAN/2," ICC 2002—IEEE International Conference on Communications, vol. 25 (1), Apr. 2002, pp. 664-668.
Non-Final Office Action for U.S. Appl. No. 11/500,405, mailed Apr. 14, 2009, 9 pgs.

* cited by examiner

*Primary Examiner*—Ted M Wang
(74) *Attorney, Agent, or Firm*—Sterne Kessler Goldstein & Fox, P.L.L.C.

(57) ABSTRACT

Methods and systems for reconfigurable soft-output bit demapping, reconfigurable for different modes of operation (i.e., different transmitter/receiver configurations) and for different modulation schemes are provided. In an embodiment, a reconfigurable soft-output bit demapping system includes a mode/modulation independent equalizer, a plurality of mode/modulation independent soft-slicers coupled to the outputs of the equalizer, a plurality of mode/modulation independent post-scalers coupled to the outputs of the soft-slicers, and a mode-dependent coefficient calculator. The coefficient calculator generates parameters for configuring the equalizer, the soft-slicers, and the post-scalers according to the used mode of operation and modulation scheme.

23 Claims, 21 Drawing Sheets

BPSK

$\Lambda_{R,0} = y_R$

QPSK

$\Lambda_{R,0} = y_R$ $\Lambda_{I,0} = y_I$

16-QAM

$\Lambda_{R,0} = y_R$
$\Lambda_{R,1} = 2 \cdot (REF \cdot K) - |\Lambda_{R,0}|$ $\Lambda_{I,0} = y_I$
$\Lambda_{I,1} = 2 \cdot (REF \cdot K) - |\Lambda_{I,0}|$

64-QAM

$\Lambda_{R,0} = y_R$
$\Lambda_{R,1} = 4 \cdot (REF \cdot K) - |\Lambda_{R,0}|$
$\Lambda_{R,2} = 2 \cdot (REF \cdot K) - |\Lambda_{R,1}|$ $\Lambda_{I,0} = y_I$
$\Lambda_{I,1} = 4 \cdot (REF \cdot K) - |\Lambda_{I,0}|$
$\Lambda_{I,2} = 2 \cdot (REF \cdot K) - |\Lambda_{I,1}|$

256-QAM

$\Lambda_{R,0} = y_R$
$\Lambda_{R,1} = 8 \cdot (REF \cdot K) - |\Lambda_{R,0}|$
$\Lambda_{R,2} = 4 \cdot (REF \cdot K) - |\Lambda_{R,1}|$
$\Lambda_{R,3} = 2 \cdot (REF \cdot K) - |\Lambda_{R,2}|$ $\Lambda_{I,0} = y_I$
$\Lambda_{I,1} = 8 \cdot (REF \cdot K) - |\Lambda_{I,0}|$
$\Lambda_{I,2} = 4 \cdot (REF \cdot K) - |\Lambda_{I,1}|$
$\Lambda_{I,3} = 2 \cdot (REF \cdot K) - |\Lambda_{I,2}|$ QAM-scheme-dependent
mode-dependent

FIG. 8

| QAM (modulation scheme) | K-factor | Bit Shift Control | | | Read-out Control |
|---|---|---|---|---|---|
| | K | n1 | n2 | n3 | signals forwarded to subsequent blocks |
| BPSK | K1 | don't care | don't care | don't care | $\Lambda_{R,0}$ |
| QPSK | K2 | don't care | don't care | don't care | $\Lambda_{R/I,0}$ |
| 16-QAM | K4 | 1 | don't care | don't care | $\Lambda_{R/I,0/1}$ |
| 64-QAM | K6 | 2 | 1 | don't care | $\Lambda_{R/I,0/1/2}$ |
| 256-QAM | K8 | 3 | 2 | 1 | $\Lambda_{R/I,0/1/2/3}$ |
| ... | | | | | |

FIG. 11

| QAM select | k_sel | clock cycle c=0 | | | clock cycle c=1 | | | clock cycle c=2 | | | clock cycle c=3 | | | clock cycle c=4 | | | clock cycle c=5 | | | clock cycle c=6 | | | clock cycle c=7 | | |
|---|---|---|---|---|---|---|---|---|---|---|---|---|---|---|---|---|---|---|---|---|---|---|---|---|---|
| | | iq_sel | n | f_sel, inv | iq_sel | n | f_sel, inv | iq_sel | n | f_sel, inv | iq_sel | n | f_sel, inv | iq_sel | n | f_sel, inv | iq_sel | n | f_sel, inv | iq_sel | n | f_sel, inv | iq_sel | n | f_sel, inv |
| BPSK | 0 | I | off | 1 | N/A | N/A | N/A | N/A | N/A | N/A | N/A | N/A | N/A | N/A | N/A | N/A | N/A | N/A | N/A | N/A | N/A | N/A | N/A | N/A | N/A |
| QPSK | 1 | I | off | 1 | Q | off | 1 | N/A | N/A | N/A | N/A | N/A | N/A | N/A | N/A | N/A | N/A | N/A | N/A | N/A | N/A | N/A | N/A | N/A | N/A |
| 16-QAM | 2 | I | off | 1 | I | 1 | 0 | Q | 1 | 1 | Q | 1 | 0 | N/A | N/A | N/A | N/A | N/A | N/A | N/A | N/A | N/A | N/A | N/A | N/A |
| 64-QAM | 3 | I | off | 1 | I | 2 | 0 | I | 1 | 0 | Q | off | 1 | Q | 2 | 0 | Q | 1 | 0 | N/A | N/A | N/A | N/A | N/A | N/A |
| 256-QAM | 4 | I | off | 1 | I | 3 | 0 | I | 2 | 0 | I | 1 | 0 | Q | off | 1 | Q | 3 | 0 | Q | 2 | 0 | Q | 1 | 0 |

N/A = not applicable
d/c = don't care (irrelevant)
off = set output to constant value 0

FIG. 13

|  | SIMO | | Compare: SISO |
|---|---|---|---|
|  | Option #1 | Option #2 |  |
| $W_{11}$ | $\dfrac{N_2 H_{11}^*}{N_1}$ | $H_{11}^*$ | $H_{11}^*$ |
| $W_{12}$ | $H_{21}^*$ | $\dfrac{N_1 H_{21}^*}{N_2}$ | N/A |
| SCALE_1 | $\dfrac{1}{N_2}$ | $\dfrac{1}{N_1}$ | $\dfrac{1}{N_1}$ |
| REF_1 | $\dfrac{N_2}{N_1}|H_{11}|^2 + |H_{21}|^2$ | $|H_{11}|^2 + \dfrac{N_1}{N_2}|H_{21}|^2$ | $|H_{11}|^2$ |

FIG. 19

$$H = \begin{bmatrix} H11 & n/a \\ H21 & n/a \end{bmatrix}$$

W21, W22 = 0
REF_2, SCALE_2 = irrelevant

|  | MIMO | Compare: SISO |
|---|---|---|
| W | $\begin{bmatrix} H_{22} & -H_{12} \\ H_{21} & H_{11} \end{bmatrix} e^{-j\angle H_{det}}$ | $H_{11}^*$ |
| SCAL_1 | $\dfrac{\|H_{det}\|}{N_1\|H_{22}\|^2 + N_2\|H_{12}\|^2}$ | $\dfrac{1}{N_1}$ |
| SCAL_2 | $\dfrac{\|H_{det}\|}{N_1\|H_{21}\|^2 + N_2\|H_{11}\|^2}$ | N/A |
| REF_1, REF_2 | $\|H_{det}\|$ | $\|H_{11}\|^2$ |

$H_{det} = H_{11}H_{22} - H_{21}H_{12}$

FIG. 20

METHODS AND SYSTEMS FOR SOFT-BIT DEMAPPING

CROSS-REFERENCE TO RELATED APPLICATIONS

The present application claims the benefit of U.S. Provisional Patent Application No. 60/707,524 filed on Aug. 12, 2005, which is incorporated herein by reference.

BACKGROUND OF THE INVENTION

1. Field of the Invention

The invention relates to soft-output bit demapping of data symbols.

2. Related Art

Soft-output bit demapping is a process of converting received data symbols to soft bit values in a coordinate system. The soft bit values represent a probability that a given data symbol resides at a particular point in the coordinate system. A subsequent decoding process will convert soft bits to hard bits, based in part upon a decryption scheme.

Transmission and reception systems operate in one of a variety of modes of operation. For example, data can be transmitted and received with a single transmit antenna and a single receive antenna, a single transmit antenna and multiple receive antennas, or with multiple transmit antennas and multiple receive antennas. Conventional demapping systems are designed for a single mode of operation.

Data can be transmitted using a variety of modulation schemes, such as binary phase shift keying ("BPSK"), quadrature phase shift keying ("QPSK"), and quadrature amplitude modulation ("QAM"), including 16 bit QAM, 64 bit QAM, and 256 bit QAM. Conventional demapping systems utilize separate detectors for each modulation scheme.

Soft-bit demapping for single input/single output systems is taught in Tosato and Bisaglia, "Simplified Soft-Output Demapper for Binary Interleaved COFDM with Application to HIPERLAN/2," ICC 2002—IEEE International Conference on Communications, vol. 25, no. 1, April 2002, pp. 664-668, incorporated herein by reference in its entirety. Soft bit demapping has not been applied to systems having multiple transmit antennas and multiple receive antennas.

What are needed therefore are methods and systems for soft-bit demapping that are reconfigurable for different modes of operation and for different modulation schemes.

SUMMARY OF THE INVENTION

The present invention is directed to methods and systems for reconfigurable soft-bit demapping. The methods and systems for soft-bit demapping are reconfigurable for different modes of operation (i.e., different transmitter/receiver configurations), and for different modulation schemes.

In an embodiment, a reconfigurable soft-bit demapping system includes a generic, or mode independent, multiple input, multiple output equalizer, a plurality of a generic, or mode independent, single-input/single-output ("SISO") slicers coupled to the outputs of the equalizer, and a mode-dependent coefficient calculator. The coefficient calculator generates coefficients for the equalizer and for the slicers. The equalizer is dynamically reconfigurable to handle multiple modes of operation. The reconfigurable soft-bit demapping system further includes relatively compact logic that allows the slicers to handle a combination of modulation schemes, such as, without limitation, BPSK, QPSK, 16-QAM, 64-QAM, and 256-QAM.

Additional features and advantages of the invention are set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing summary and the following detailed description are exemplary and explanatory and are intended to provide further explanation of the invention as claimed.

BRIEF DESCRIPTION OF THE DRAWINGS/FIGURES

The present invention will be described with reference to the accompanying drawings, wherein like reference numbers indicate identical or functionally similar elements. Also, the leftmost digit(s) of the reference numbers identify the drawings in which the associated elements are first introduced.

FIG. 8 illustrates equations implemented by a configurable soft-slicer according to an embodiment of the present invention.

FIG. 11 illustrates exemplary control signals for the configurable soft-slicer embodiment of FIG. 10.

FIG. 13 illustrates exemplary control signals for the configurable soft-slicer embodiment of FIG. 12.

FIG. 19 illustrates exemplary SIMO parameterization configurations.

FIG. 20 illustrates an exemplary MIMO parameterization configuration.

The present invention will be described with reference to the accompanying drawings. The drawing in which an element first appears is typically indicated by the leftmost digit(s) in the corresponding reference number.

DETAILED DESCRIPTION OF THE INVENTION

Table of Contents

I. Introduction

II. Introduction to Soft-Output Demapping

III. Re-configurable Soft-Output Demapping
  A. Soft-Slicer
  B. Post-Scaler
  C. Equalizer
  D. Coefficient Calculator IV. Conclusion

I. INTRODUCTION

Figure 1:
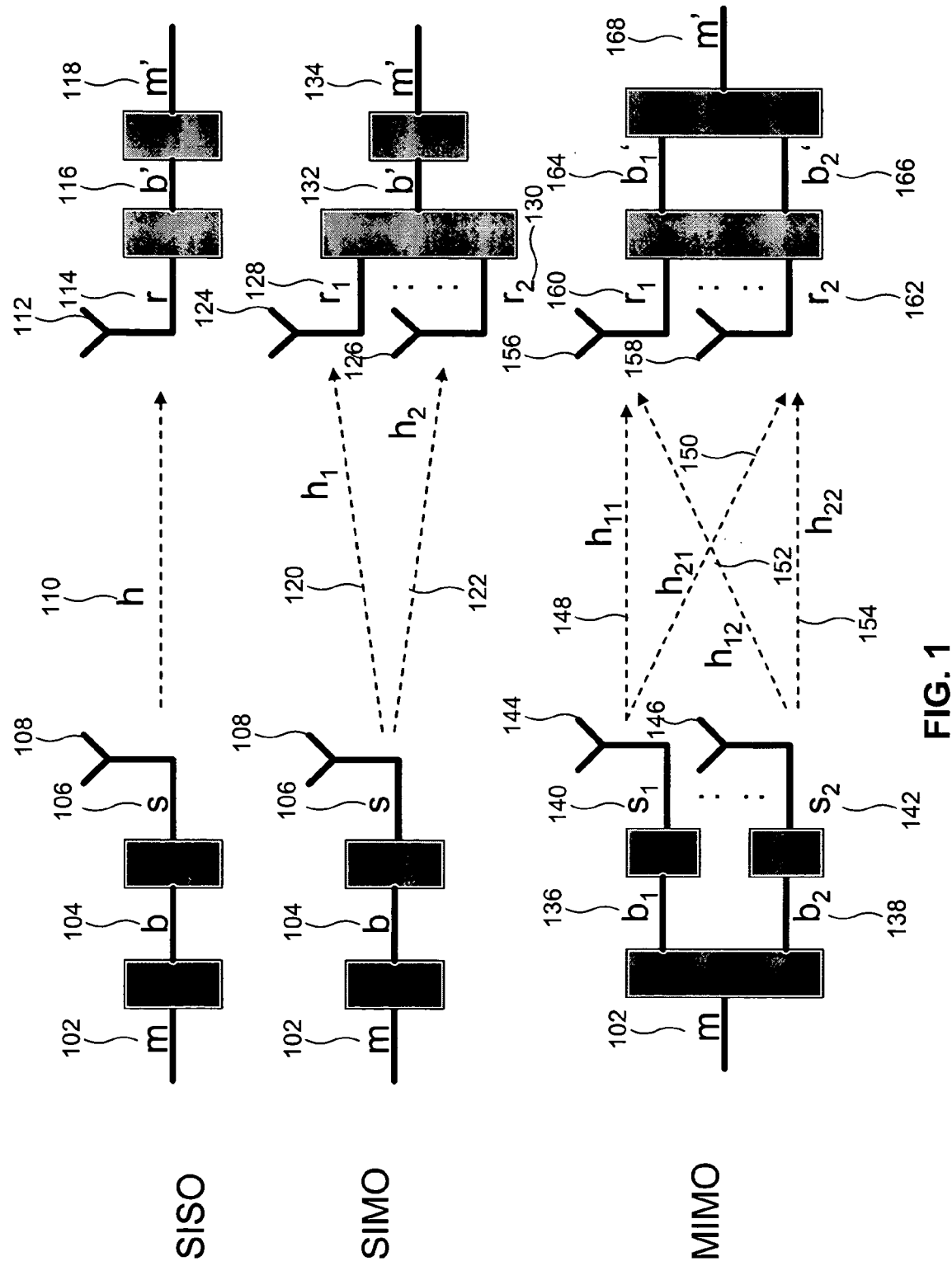
FIG. 1 illustrates various configurations of wireless communication systems.

Wireless communication systems distinguish between various configurations according to the number of transmit/receive antennas. FIG. 1 illustrates various configurations of wireless communication systems.

A single-input single-output (SISO) communication system (illustrated at the top of FIG. 1) is one characterized by a single transmit antenna 108 and a single receive antenna 112, with the wireless communication channel serving as a medium for transmitting signals from the transmitter to the receiver. The wireless communication channel between transmit antenna 108 and receive antenna 112 is characterized by a channel response 110 (denoted by h in FIG. 1). The channel response h 110 indicates the amounts of expected gain and phase changes encountered by a signal s 106 transmitted from transmit antenna 108 to receive antenna 112. In other words, the channel response h 110 is a description of channel conditions of the wireless communication channel between transmit antenna 108 and receive antenna 112. Accordingly, channel response h 110 is time-variant and is typically only considered constant over a coherence time of the channel.

Generally, the transmitted signal s 106 is the result of the channel encoding of a message m 102 to generate an encoded message b 104 followed by the modulation of b 104 to generate modulated signal s 106. Message m 102 is typically an unprotected binary information sequence. The channel encoding of message m 102 typically includes the inserting of additional bits for error protection. This may be performed according to a variety of error coding schemes including, for example, convolutional encoding, cyclic redundancy check (CRC) encoding, or turbo encoding. Subsequently, the error-protected message b 104 is modulated to generate signal s 106, which can be transmitted over the wireless channel. Typically, the modulation of message b 104 includes the mapping of information bits of message b 104 into coordinates of a complex constellation according to the particular modulation scheme being used. This will be further described in section II.

The modulated signal s 106 is typically a complex analog signal. Typically, signal s 106 is frequency up-converted to RF (radio frequency) before transmission over the wireless channel. For ease of illustration, this aspect of the communication chain is not shown in FIG. 1

Assuming relatively narrowband transmission, the received signal r 114 at receive antenna 112 can be described mathematically according to the following equation:

$$r = h*s + n \quad (1)$$

where n denotes noise added to a channel processed signal (h*s). The channel processed signal (h*s) is the result of the multiplication of transmitted signal s 106 by the channel response h 110 between transmit antenna 108 and receive antenna 112. This multiplication typically results in a scaling and rotation operation of the complex signal representation of signal s.

At the receiver side, the received signal r 114 is first demodulated to generate a binary information sequence b'. Ideally, b' 116 is identical to b 104. b' 116 is then decoded to generate a message m' 118. m' 118 is identical to m 102 unless errors occurred during transmission. Typically, the decoding of b' 116 is aided by the error-protection scheme performed in encoding message m 102.

A single-input multiple-output (SIMO) communication system is also illustrated in FIG. 1. The SIMO system includes a single transmit antenna 108 as described above with respect to the SISO system. The SIMO system further includes a plurality of receive antennas 124 and 126 at the receiver side. Note that for ease of illustration, only two receive antennas 124 and 126 are illustrated in FIG. 1. In general, as can be understood by persons skilled in the art, any integer number of receive antennas can be used.

Similar to the SISO system above, a modulated signal s 108 is transmitted over the wireless channel by transmit antenna 108. The transmitted signal s 106 is received respectively at the plurality of receive antennas 124 and 126, with received signals $r_1$ 128 and $r_2$ 130 being respectively related to the transmitted signal s 106 according to:

$$r_1 = h_1 * s + n_1$$
$$r_2 = h_2 * s + n_2 \quad (2)$$

where $(h_1, n_1)$ and $(h_2, n_2)$ denote respectively the channel response and noise between transmit antenna 108 and receive antennas 124 and 126.

At the receiver side, received signals $r_1$ 128 and $r_2$ 130 contain the same (single) message m 102 after encoding and modulation to generate the signal s, the application of channel responses $h_1$ and $h_2$, and the addition of noise, respectively. Received signals $r_1$ and $r_2$ are jointly used to generate a binary sequence b' 132, which is further decoded to generate sequence m' 134. Note that since signals $r_1$ 128 and $r_2$ 130 contain the same message m 102, the decoding of message m 102 is typically more robust in the SIMO case than in a SISO system. For example, if one path between transmit antenna 108 and a receive antenna suffers from high levels of multi-path fading, other paths are likely to have acceptable channel conditions, thereby enhancing the likelihood of successful communication between the transmit and receive sides.

In similar fashion, SIMO systems can be used to perform beamforming by combining antenna signals to point in a specific direction. Further, receive combining diversity, where antenna signals are combined to optimally adapt to local channel conditions, can be achieved using SIMO systems. One well-known technique is Maximum-Ratio-Combining (MRC), in which antenna signals are weighted, phase-aligned, and added in such a way as to maximize the signal-to-noise (SNR) ratio.

FIG. 1 further illustrates a multiple-input multiple-output (MIMO) communication system, which includes a plurality of transmit antennas 144 and 146 and a plurality of receive antennas 156 and 158. For ease of illustration, only two transmit antennas 144 and 146 and two receive antennas 156 and 158 are shown in FIG. 1. However, as would be appreciated by a person skilled in the art, any integer number of transmit/receive antennas can be used in a MIMO system.

At the transmit side of the MIMO system, a message m 102 is encoded for error-protection and then divided into a plurality of binary sequences $b_1$ 136 and $b_2$ 138. The plurality of binary sequences $b_1$ 136 and $b_2$ 138 are then modulated to generate a plurality of signals $s_1$ 140 and $s_2$ 142. Signals $s_1$ 140 and $s_2$ 142 are then simultaneously transmitted over the wireless channel.

At the receive side of the MIMO system, superpositions of signals $s_1$ 140 and $s_2$ 142 are received at each of receive antennas 156 and 158. The received signals $r_1$ 160 and $r_2$ 162 at receive antennas 156 and 158 are related to transmitted signals $s_1$ 140 and $s_2$ 142 according to the following:

$$r_1 = h_{11}*s_1 + h_{12}*s_2 + n_1$$

$$r_2 = h_{21}*s_1 + h_{22}*s_2 + n_2 \qquad (3)$$

where $h_{ij}$ in equations (3) denotes the channel response between the $i^{th}$ receive antenna and the $j_{th}$ transmit antenna in the MIMO system, and n1 and n2 denote noise at receive antennas 156 and 158, respectively.

Typically, depending on the channel responses between the various transmit and receive antennas, the actual forms in which $s_1$ and $s_2$ are superimposed at the receive antennas will differ. Accordingly, it is the task of the receiver to separate out and reconstruct the original binary sequences $b_1$ 136 and $b_2$ 138 by exploiting both $r_1$ and $r_2$. As shown in FIG. 1, binary sequences $b'_1$ 164 and $b'_2$ 166 are generated from received signals $r_1$ 160 and $r_2$ 162 and are then decoded and combined to generate a message m' 168. Given a successful transmission, message m' 168 is identical to message m 102. It is noted that in certain environments, such as rich scattering propagation environments, MIMO communication can be used to increase the throughput of the system.

The present invention is concerned with a multiple-antenna receiver structure that is capable of operation in all of the above described communication system configurations (SISO, SIMO, and MIMO). In such a multiple-antenna/multiple mode receiver, a SISO scenario may arise from the turning off of one or more receive antennas to maintain a single active antenna. This may be the case, for example, in a low-power configuration in which one or more receive antennas are switched off to reduce power consumption. Similarly, a SIMO or MIMO scenario arises when multiple receive antenna branches are exploited to reconstruct a single or multiple transmitted signals.

II. INTRODUCTION TO SOFT-BIT DEMAPPING

Figure 2:
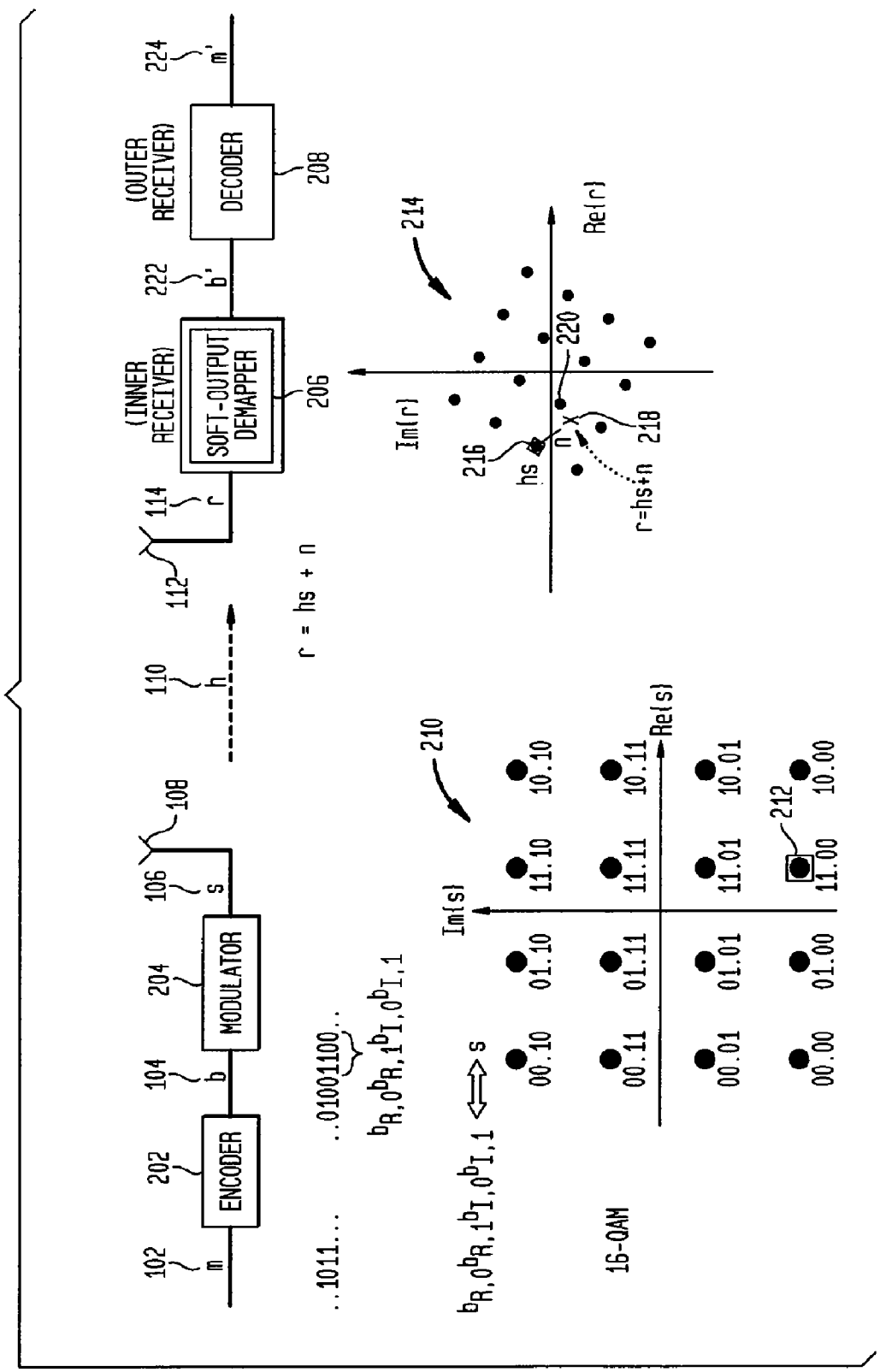
FIG. 2 illustrates an exemplary single-input single-output (SISO) transmit-receive communication chain.

FIG. 2 illustrates an exemplary single-input single-output (SISO) transmit-receive communication chain. A binary message m 102 is encoded for error-protection using an encoder 202 to generate an encoded binary sequence b 104. Encoder 202 may be, for example, a convolutional encoder. Bit-interleaving may also be performed by encoder 202. Bits of encoded sequence b 104 are modulated using a modulator 204 to generate modulated signal 106. Signal 106 can be transmitted over the wireless channel using transmit antenna 108.

An example modulation of the encoded sequence b 104 is shown in FIG. 2 according to a 16-QAM (Quadrature Amplitude Modulation) modulation scheme. According to this scheme, bits (four bits a time) of sequence b 104 are mapped to one of 16 constellation points of a complex signal space 210. For example, bit sequence 1100 of encoded sequence b 104 is mapped to constellation point 212 in complex signal space 210. The modulated signal s 106 that results from the QAM-modulation of bit sequence 1100 of encoded sequence b 104 is a complex envelope signal having real and imaginary parts according to the real and imaginary parts of constellation point 212 in complex signal space 210.

Modulated signal s 106 is transmitted over the wireless channel (after frequency up-conversion) and is received by receive antenna 112. Received signal 114 is mathematically related to transmitted signal s 106 as described above in (1). The wireless transmission of signal s 106 results in a scaling and rotation operation to the original constellation point of signal s 106 in complex signal space 210. Received noise at the receiver further results in a translation operation to the scaled and rotated constellation point. This is illustrated in received complex signal space 214, where point hs 216 corresponds to the scaled and rotated constellation point due to wireless transmission and point x 218 corresponds to the received constellation point due to the further addition of noise at the receiver. Typically, in case of additive Gaussian noise, the point x 218 can fall anywhere around the point hs 216.

Various approaches exist to recover the encoded sequence b 104 from received signal r 114. One approach, known as "hard-output demapping", works by mapping the received point x 218 to the nearest constellation point in received complex signal space 214. For example, referring to FIG. 2, point x 218 is mapped to constellation point 220 in complex signal space 214. Accordingly, bit sequence 1100 would be wrongly demodulated as bit sequence 1101, resulting in low demapping performance. Another approach, known as "soft-output demapping", works by assigning soft-bits or preliminary likelihood values to the bits encoded in received signal r 114. In FIG. 2, this is performed using soft-output demapper (inner receiver) 206. Soft-bits or preliminary likelihood values indicate how likely is the demapper to consider a certain bit (each of the four) to have value 1 or value 0. One example of soft-bits are log-likelihood ratios (LLRs, or L-values), which take positive values for the bit likely being a logical 1 and negative values for the bit likely being a logical 0, with the larger the absolute value of the L-value indicating the higher the confidence of the demapper in the preliminary value. For example, a numeric range of −128 to +127 may be used, with the value 0 indicating no decision, negative values indicating logical 0, positive values indicating logical 1, and values close to the range limits referring to high confidence on the assigned bit polarity.

Accordingly, soft-output demapper 206 generates soft-bits b' 222 based on received signal r 114. Soft-bits b' 222 are used by decoder (outer receiver) 208 to make hard-decisions on each bit of message m 102, thereby generating message m' 224. Note that due to redundancy in encoded sequence b 104, more than one bit of soft-bits b' 222 are used to make a hard-decision on a single bit of message m' 224.

Figure 3:
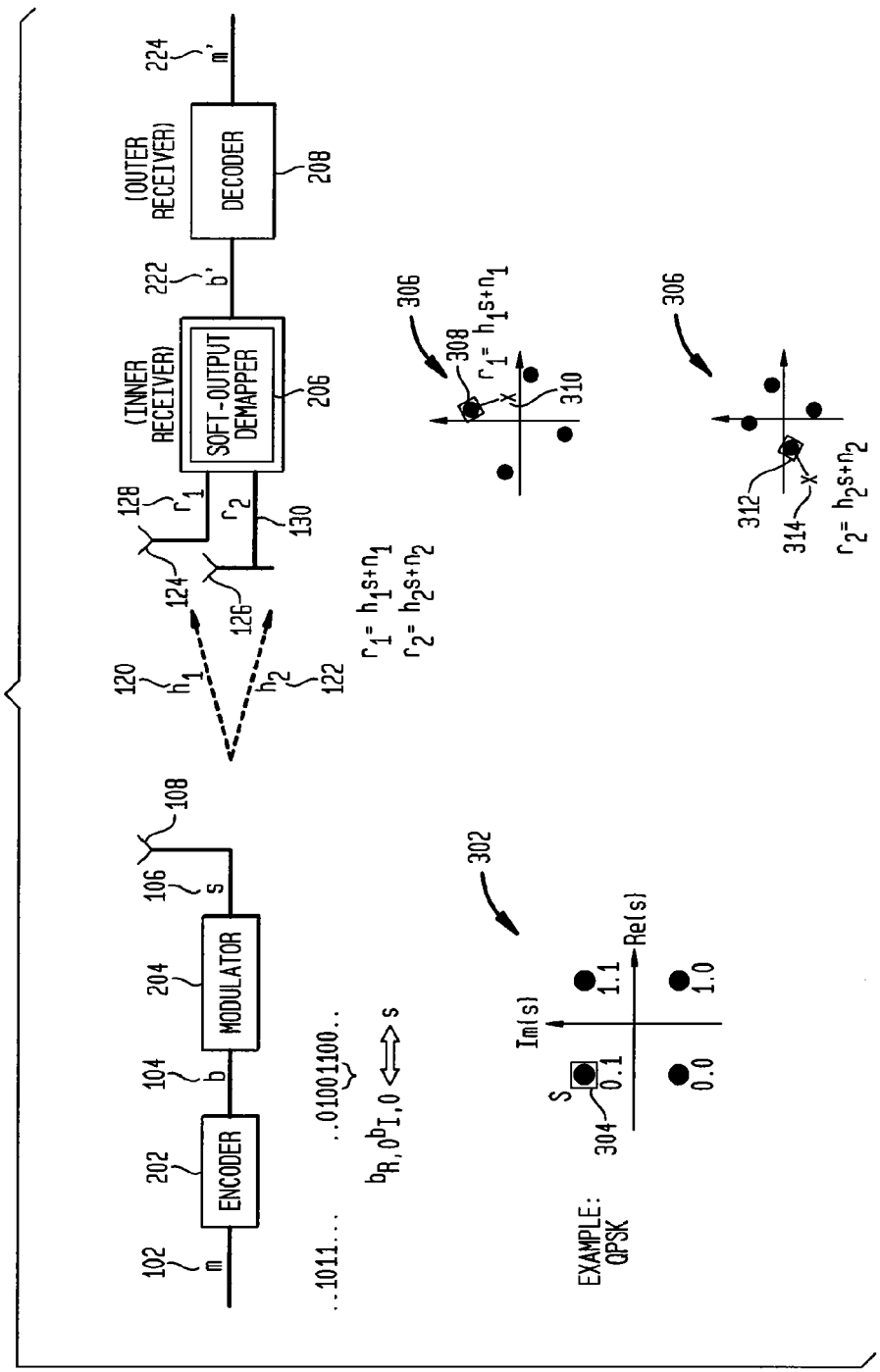
FIG. 3 illustrates an exemplary single-input multiple-output (SIMO) transmit-receive communication chain.

FIG. 3 illustrates soft-output demapping in an exemplary single-input multiple-output (SIMO) transmit-receive communication chain.

A signal s 106, modulated according to a QPSK (Quadrature Phase Shift Keying) modulation scheme, is transmitted over a wireless channel and is received by receive antennas 124 and 126, respectively. Note that modulated signal s 106 is generated by mapping two bits a time of encoded sequence b 104 to one constellation point in complex signal space 302. In the example of FIG. 3, the bit sequence 01 is mapped to constellation point 304.

The transmitted signal s 106 is received at received antennas 124 and 126 as received signals $r_1$ 128 and $r_2$ 130, respectively. Note that the example of FIG. 3 illustrates only two receive antennas, but any integer number of antennas may be used in a general SIMO case. $r_1$ 128 and $r_2$ 130 are related to s 106 as described in (2) above. The effect of wireless transmission and noise on transmitted signal s 106 when received at receive antennas 124 and 126 is illustrated in FIG. 3 using a complex space representation. Note that in complex signal representation, signals $r_1$ 128 and $r_2$ 130 are scaled, rotated, and translated relative to signal s 106.

Similar to the SISO case described above, the function of soft-output demapper (inner receiver) 206 is to generate soft-bits (or L-values) for each bit of encoded sequence b 104. In the SIMO case, however, soft-output demapper 206 exploits both received signals $r_1$ 128 and $r_2$ 130 to perform soft-output demapping. Typically, the better the outcome of the demapping carried in the inner receiver, the higher the probability that decoder 208 (outer receiver) will be able to estimate the original message m 102. Often, exploiting received information at one or more antennas has the potential to significantly improve the quality of soft-bits compared to a SISO case. This may be the case, for example, if one antenna is in a multipath fade but other antennas exhibit strong receive signal.

Figure 4:
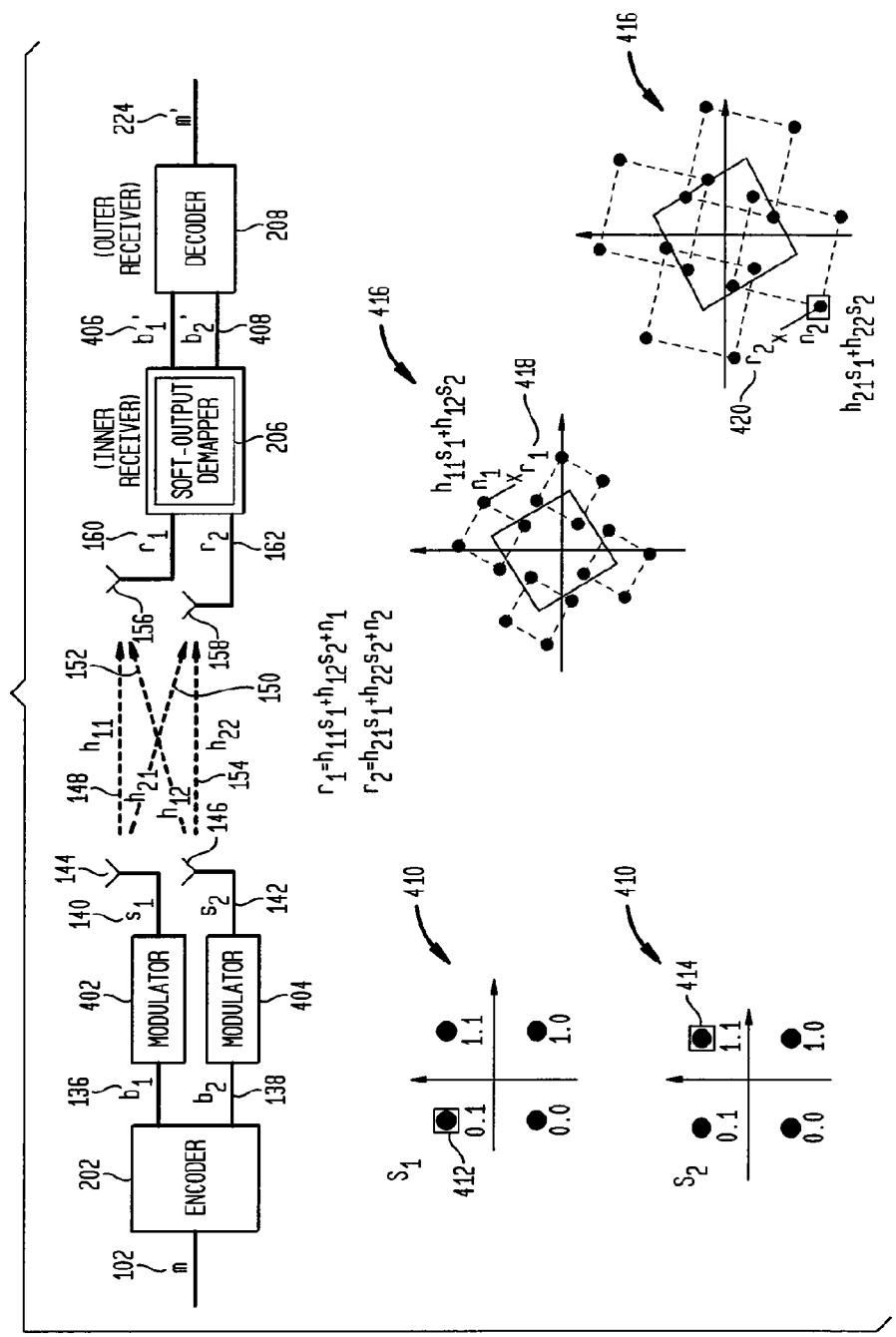
FIG. 4 illustrates an exemplary multiple-input multiple-output (MIMO) transmit-receive communication chain.

FIG. 4 illustrates soft-output demapping in an exemplary multiple-input multiple-output (MIMO) transmit-receive communication chain. It is noted that the exemplary communication chain of FIG. 4 illustrates a 2×2 MIMO case, but can be extended to a more general n×m MIMO case, for any integer numbers n and m, as would be appreciated by a person skilled in the art.

Referring to FIG. 4, a message m 102 is encoded using an encoder 202 to generate an encoded sequence, which is divided into a plurality of binary sequences $b_1$ 136 and $b_2$ 138. The binary sequences $b_1$ 136 and $b_2$ 138 are modulated using modulators 402 and 404 to generate modulated signals $s_1$ 140 and $s_2$ 142, respectively. In the example of FIG. 4, signals $s_1$ 140 and $s_2$ 142 are generated according to a QPSK modulation of binary sequences $b_1$ 136 and $b_2$ 138. Modulated signals $s_1$ 140 and $s_2$ 142 are transmitted over the wireless channel using transmit antennas 144 and 146.

At the receive side, receive antennas 156 and 158 receive superpositions of transmitted signals $s_1$ 140 and $s_2$ 142. Received signals $r_1$ 160 and $r_2$ 162 are mathematically related to $s_1$ 140 and $s_2$ 142 as described in (3) above. Complex signal representations 418 and 420 of received signals $r_1$ 160 and $r_2$ 162 are shown in FIG. 4. Note that according to the used QAM modulation scheme, each of received signals $r_1$ 160 and $r_2$ 162 may fall anywhere around any one of 16 different points in received complex space 416. These 16 points result from all possible summations of each (scaled and rotated) constellation point of the $s_1$ transmit constellation space and each (scaled and rotated) constellation point of the $s_2$ transmit constellation space.

Similar to the SIMO case, soft-output demapper (inner receiver) 206 makes use of the various received signals $r_1$ 160 and $r_2$ 162 to generate soft-bits (or L-values) $b'_1$ 406 and $b'_2$ 408 for binary sequences $b_1$ 136 and $b_2$ 138, respectively. The soft-bits are then used by decoder 208 to generate an estimate message m' 224 of message m 102.

Figure 5:
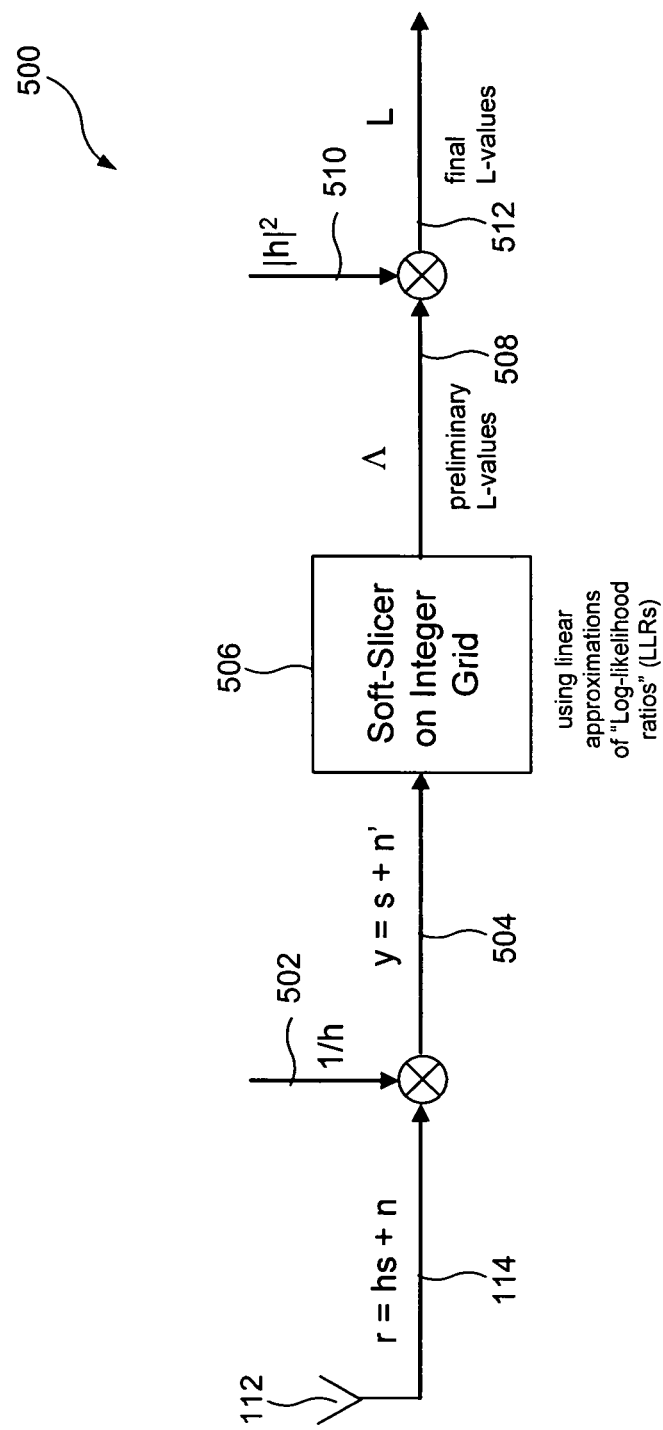
FIG. 5 illustrates a SISO soft-output demapper.

FIG. 5 illustrates a conventional SISO soft-output demapping scheme 500. A received signal (r=h*s+n) 114 is first multiplied by a signal 502 of value 1/h, where h is the channel response of the wireless channel. The multiplication of r by 1/h has the effect of removing the scaling and rotation due to wireless channel transmission of the transmitted signal s. Note that the channel response h is typically estimated using an independent Channel Estimation procedure. The resulting signal (y=s+n') 504 is the equivalent of the original transmitted signal s, translated in complex space by a noise signal n'=n/h, where n is the noise at receive antenna 112.

Subsequently, a soft-slicer on integer grid 506 performs soft-output demapping using y 504, to generate soft-bits or preliminary L-values 508 for bits contained in received signal r 114. Further, to account for the signal-to-noise ratio (SNR) in the generated L-values 508, the preliminary L-values 508 are multiplied by a signal 510 of value $|h^2|$ to generate final L-values 512.

Ideally, a soft-bit demapper implements Maximum Likelihood (ML) demapping, which provides superior detection performance. ML demapping is well known in the art of SISO demapping. Traditionally, ML demapping has been achieved for single-transmit antenna systems (that is, single transmit stream systems such as SISO and SIMO), but is difficult to implement for multiple transmit antenna systems (i.e., MIMO).

Figure 6:
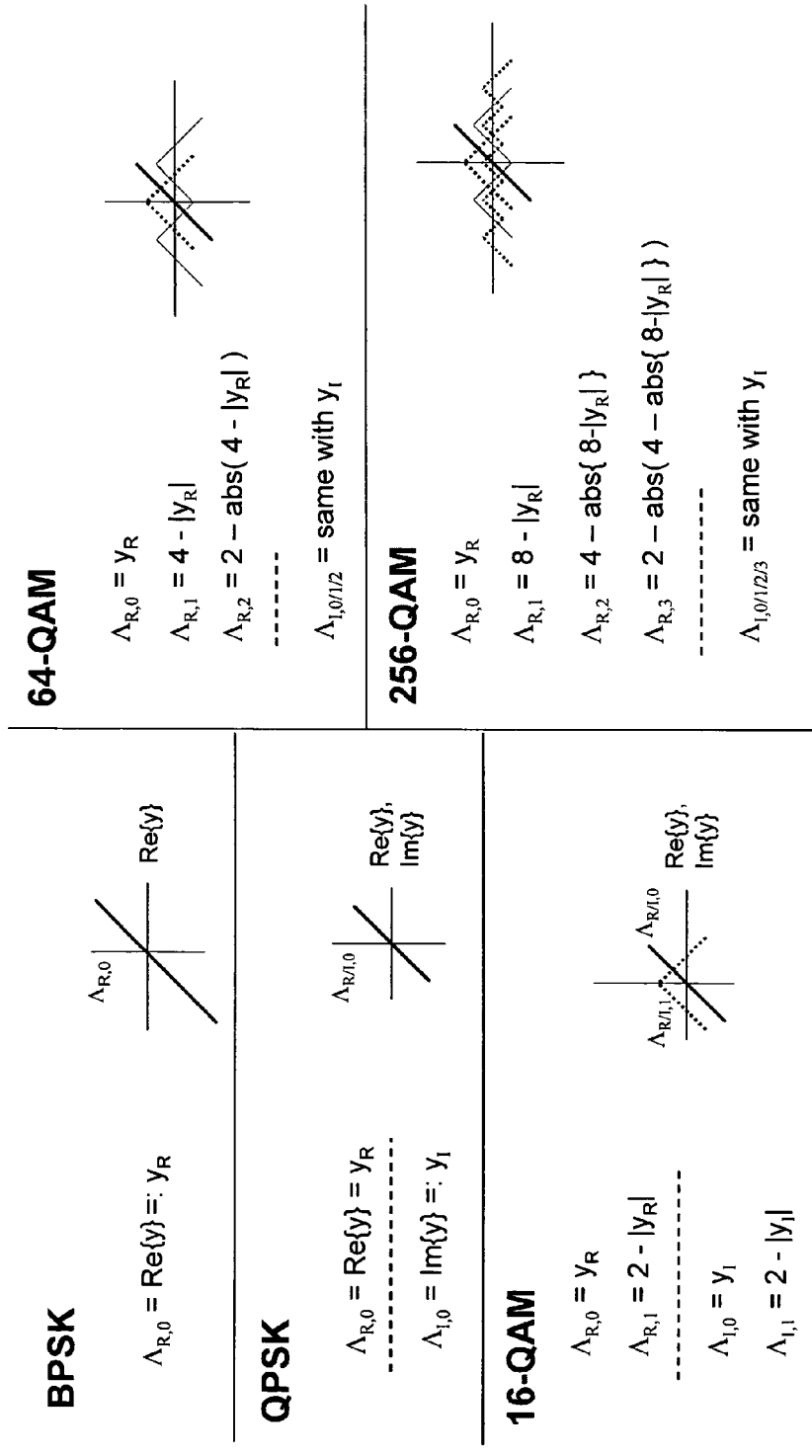
FIG. 6 illustrates exemplary equations for generating preliminary L-values according to various modulation schemes.

In the case that Gray coding is used in the modulation scheme constellation (i.e., QAM constellations in which adjacent points only differ in one bit position), a scheme by Tosato and Bisaglia exists to reliably generate preliminary L-values based on signal y 504. This scheme is taught in Tosato and Bisaglia, "Simplified Soft-Output Demapper for Binary Interleaved COFDM with Application to HIPERLAN/2," ICC 2002—IEEE International Conference on Communications, vol. 25, no. 1, April 2002, pp. 664-668, and has its equations for generating preliminary L-values derived in FIG. 6 for some of the main QAM modulation schemes (BPSK, QPSK, 16-QAM, 64-QAM, and 256-QAM). The preliminary L-values are denoted by the Λ variables in FIG. 6. For QPSK, $\Lambda_{R,0}$ refers to the L-value of the first bit of the transmitted 2-bit sequence and $\Lambda_{I,0}$ refers to the L-value of the second bit of the transmitted 2-bit sequence. For 16-QAM, $\Lambda_{R,0}, \Lambda_{R,1}, \Lambda_{I,0}, \Lambda_{I,1}$ refer respectively to the preliminary L-values of the first, second, third, and fourth bit of the transmitted 4-bit sequence. A similar naming convention is used for the equations of the 64-QAM and 256-QAM cases.

Nonetheless, the soft-output demapping scheme of FIG. 5 suffers from a number of limitations including requiring a computationally extensive division (division by h), being limited to SISO systems, and providing less than optimal performance when successive received symbols r have different noise power levels.

III. RE-CONFIGURABLE SOFT-OUTPUT DEMAPPING

Methods and systems for reconfigurable soft-output bit demapping are provided below. A soft-output bit demapper described herein is dynamically reconfigurable for multiple modes of operation (i.e., transmitter/receiver configurations), and multiple modulation schemes. For example, and without limitation, a dynamically reconfigurable soft-output bit demapper can be reconfigured for a single transmit antenna and a single receive antenna (i.e., single input/single output, or SISO), a single transmit antenna and multiple receive antennas (i.e., single input/multiple output, or SIMO), and with multiple transmit antennas and multiple receive antennas (i.e., multiple input/multiple output, or MIMO). A soft-output bit demapper described herein is also dynamically reconfigurable for multiple modulation schemes including, without limitation, BPSK, QPSK, and QAM.

A demapper system as described herein provides high detection quality (i.e., high quality of soft-bits), and can be implemented in a relatively compact, relatively inexpensive configuration with low complexity In an embodiment, a reconfigurable soft-output demapper includes generic or mode/modulation independent (mode/modulation-agnostic) equalizer, soft-slicer, and post-scaler and a mode/modulation dependent coefficient calculator for configuring the mode/modulation-agnostic equalizer, soft-slicer, and post-scaler. In an embodiment, the reconfigurable soft-output demapper uses a set of configuration parameters (coefficients) for the equalizer, soft-slicer, and post-scaler, consistent between modes, to achieve relatively low dynamic range across all modes while maintaining a relatively high quality of final soft-bits.

Figure 7:
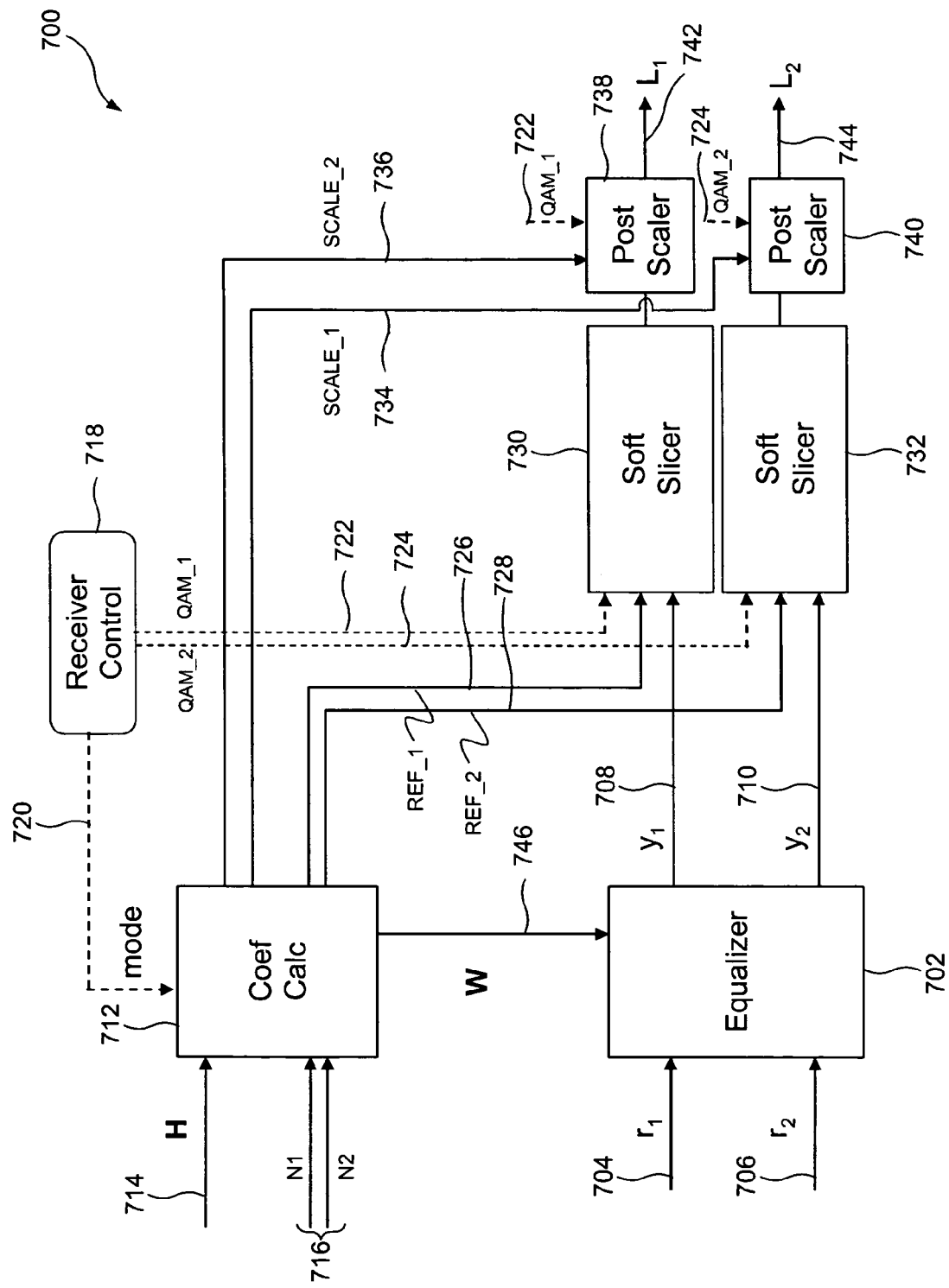
FIG. 7 illustrates a reconfigurable multi-mode soft-output demapper according to an embodiment of the present invention.

FIG. 7 illustrates an example reconfigurable multi-mode soft-output demapper 700 including a mode/modulation-agnostic equalizer 702, a plurality of mode/modulation-agnostic soft-slicers 730 and 732, a plurality of mode/modulation-agnostic post-scalers 738 and 740, and a coefficient calculator 712. Note that FIG. 7 illustrates the reconfigurable multi-mode soft-output demapper for the n×2 MIMO case, which can be readily extended to the n×m MIMO case for any integer m.

Equalizer 702 pre-processes one or more received signal streams $r_1$ 704 and $r_2$ 706 according to a weight matrix W 746, provided by coefficient calculator 712. The weight matrix W 746 is typically generated by coefficient calculator 712 using a channel response matrix H 714 and noise variances 716 associated with the one or more received streams. Weight matrix W 746 may depend on the mode of operation of demapper 700. In an embodiment, equalizer 702 corrects received streams $r_1$ 704 and $r_2$ 706 for channel effects and noise interference. At the output, equalizer 702 generates one or more equalized signals $y_1$ 708 and $y_2$ 710. Note that equalizer 702 eliminates the need for the computationally extensive division by h, described above with respect to FIG. 5.

Equalized signals $y_1$ 708 and $y_2$ 710 are received by respective soft-slicers 730 and 732, which generate soft-bits from equalized signals $y_1$ 708 and $y_2$ 710. In an embodiment, soft-slicers 730 and 732 utilize Maximum Likelihood demapping to generate the soft-bits. Soft-slicers 730 and 732 are configurable by coefficient calculator 712, which provides soft-slicers 730 and 732 with REF_1 signal 726 and REF_2 signal 728, respectively. REF_1 726 and REF_2 728 include mode-related (SISO, SIMO, or MIMO) parameters for configuring soft-slicers 730 and 732. Soft-slicers 730 and 732 also receive QAM_1 signal 722 and QAM_2 signal 724 from a receiver control module 718. QAM_1 722 and QAM_2 724 include modulation-related (e.g., BPSK, QPSK, QAM) parameters for configuring soft-slicers 730 and 732. Note that signals QAM_1 722 and QAM_2 724 are independent, thereby allowing for soft-slicers 730 and 732 to simultaneously operate according to different modulation schemes (different modulation scheme per branch).

Post-scalers 738 and 740 receive the soft-bits generated by soft-slicers 730 and 732, respectively, and scale the soft-bits using scaling factors to generate final soft-bits 742 and 744. The scaling factors used by post-scalers 738 and 740 are both mode and modulation dependent. In an embodiment, post-scalers 738 and 740 receive SCALE_1 734 and SCALE_2 736 signals from coefficient calculator 712. In an embodiment, SCALE_1 734 and SCALE_2 736 are generated by coefficient calculator 712 using noise variance signals 716. Post-scalers 738 and 744 also receive QAM_1 722 and QAM_2 724 signals from receiver control module 718. Accordingly, post-scalers 738 and 740 scale the soft-bits generated by soft-slicers 730 and 732 to ensure that the final soft-bits 742 and 744 have similar dynamic ranges both for the various modes of operation and for the various signal-to-noise conditions (across both all receive branches and successive received symbols per branch).

Various embodiments of components of the re-configurable soft-output demapper (soft-slicers, post-scalers, equalizer, and coefficient calculator) are provided below.

A. Soft-Slicers

As described above, the re-configurable soft-output demapper includes one or more mode/modulation-agnostic soft-slicers. In an embodiment, the soft-slicers are configurable soft-slicers, which implement Maximum Likelihood soft-slicing. In an embodiment, each of the one or more soft-slicers implements one or more equations for generating soft-bits (or preliminary L-values) based on received equalized signal streams.

FIG. 8 illustrates example equations implemented by a configurable soft-slicer. The equations of FIG. 8 are provided for various modulation schemes including BPSK, QPSK, 16-QAM, 64-QAM, and 256-QAM. It is noted the recursive nature of the equations of FIG. 8 for the various modulation schemes, where values of certain soft-bits are used in the computation of subsequent soft-bits. For example, for 16-QAM, the preliminary L-value $\Lambda_{R,1}$ of the second bit is calculated using the preliminary L-value $\Lambda_{R,0}$ of the first bit. This significantly reduces the computational complexity of soft-bits and results in compact soft-slicer implementations. Also noted in the equations of FIG. 8 is the use of a mode-dependent constant REF and a modulation-dependent constant K. These constants are typically received from the coefficient calculator and the receiver control module. In an embodiment, K is given according to the following:

BSPK: K=1
QPSK: $K=1/\sqrt{2}$
16-QAM: $K=1/\sqrt{10}$
64-QAM: $K=1/\sqrt{42}$
256-QAM: $K=1/\sqrt{170}$.

Figure 9:
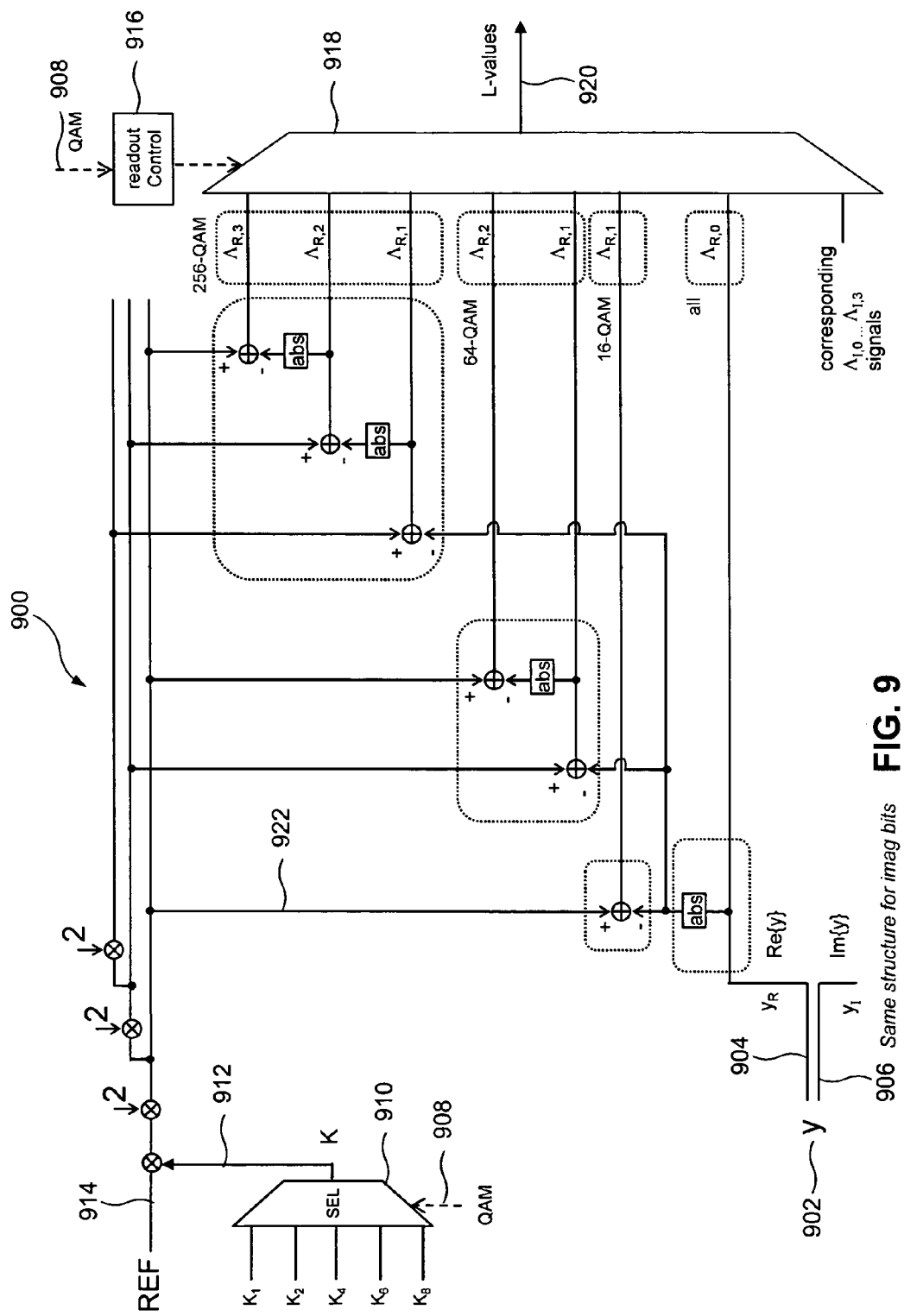
FIG. 9 illustrates a configurable soft-slicer according to an embodiment of the present invention.

FIG. 9 illustrates an exemplary configurable soft-slicer 900. Soft-slicer 900 implements the equations of FIG. 8 for generating soft-bits.

Soft-slicer 900 receives an equalized signal y 902. The equalized signal y 902 is divided into its real and imaginary parts $y_R$ 904 and $y_I$ 906, with the real part $y_R$ 904 used to generate the $\Lambda_R$ soft-bit values and the imaginary part $y_I$ 906 used to generate the $\Lambda_I$ soft-bit values. Note that, for ease of illustration, only the portion of soft-slicer 900 that generates $\Lambda_R$ soft-bit values is illustrated in FIG. 9, with the portion for generating $\Lambda_I$ soft-bit values being substantially similar.

Soft-slicer 900 includes a multiplexer 910, which receives a QAM signal 908 and outputs a modulation-dependent constant K 912 in accordance with the used modulation scheme. In an embodiment, multiplexer 910 receives QAM signal 908 from the receiver control module of the soft-output demapper. The modulation-dependent constant K 912 is multiplied by a mode-dependent constant REF 914, with the multiplication result subsequently used in generating the soft-bit values. REF 914 is typically received from the coefficient calculator in the soft-output demapper.

Soft-slicer 900 generates soft-bits for a plurality of modulation schemes as illustrated in FIG. 9. In an embodiment, the soft-bit value for the first bit ($\Lambda_{R,0}$) is generated directly from the real part $y_R$ 904 of the received equalized signal y 902. This value is subsequently recursively used to generate soft-bit values for subsequent bits in the received equalized signal y 902. For example, for 16-QAM modulation, $\Lambda_{R,0}$ is subtracted from signal 922 having value 2*REF*K to generate $\Lambda_{R,1}$.

At the output of soft-slicer 900, an output multiplexer 918 controlled by a readout control module 916 selects output L-values 920 from the generated soft-bits, according to the used modulation scheme. In an embodiment, the readout control module 916 is controlled by QAM signal 908, which is provided by the receiver control module.

Figure 10:
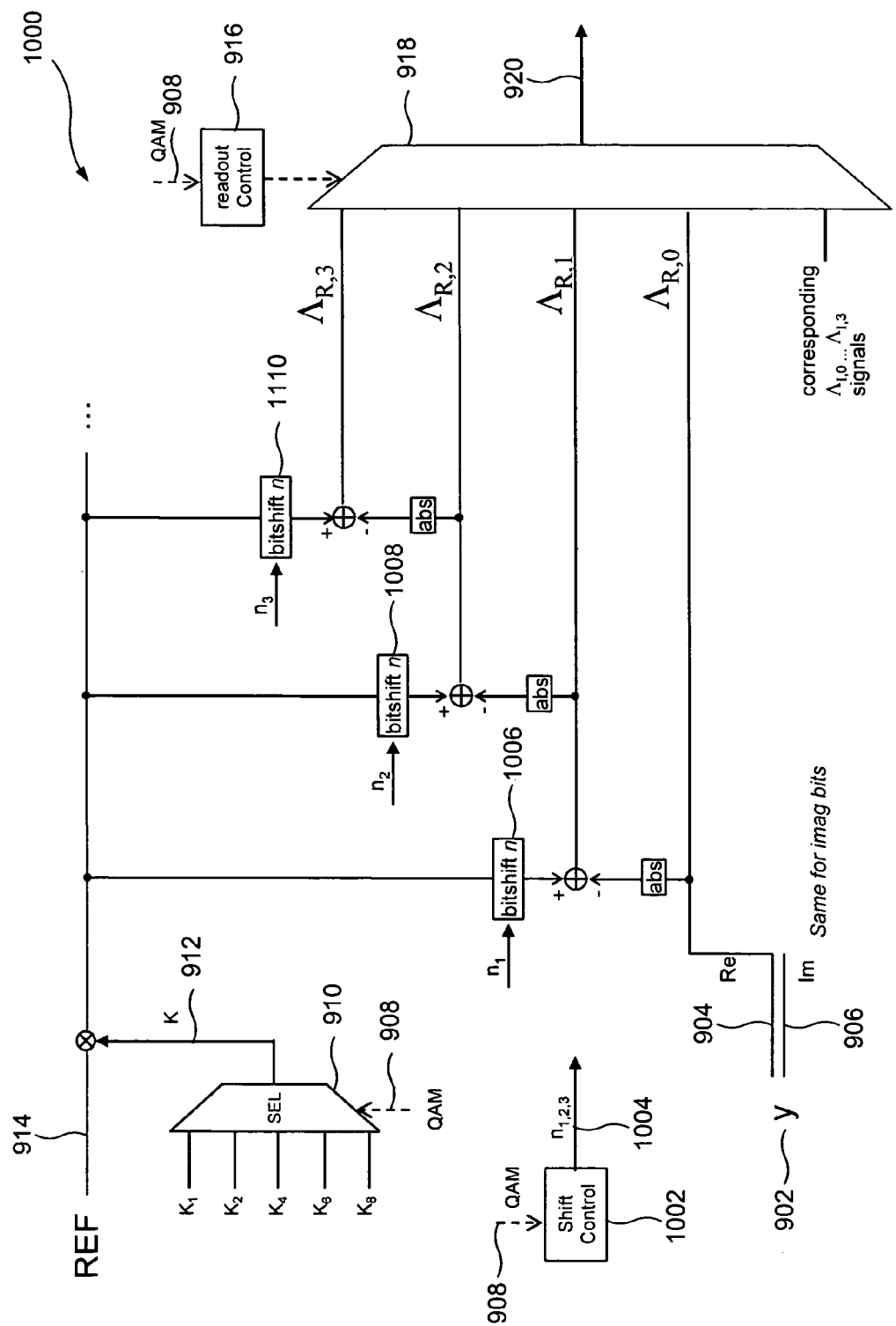
FIG. 10 illustrates another configurable soft-slicer according to an embodiment of the present invention.

FIG. 10 illustrates a configurable soft-slicer 1000 according to another embodiment of the present invention. For ease of illustration, only the portion of soft-slicer 1000 that generates $\Lambda_R$ soft-bit values is illustrated in FIG. 10, with the portion for generating $\Lambda_I$ soft-bit values being substantially similar.

Similar to the soft-slicer embodiment of FIG. 9, soft-slicer 1000 includes a multiplexer 908 that outputs the modulation-dependent constant K 912 and an output multiplexer 918 for outputting L-values 920.

On the other hand, soft-slicer 1000 employs bit-shift structures 1006, 1008, and 1010 to alternatively perform the factor of 2 multiplication operations, implemented in the embodiment of FIG. 9. It is known that an n-bit bit-shift is the equivalent of a multiplication by $2^n$. In an embodiment, bit-shift structures 1006, 1008, and 1010 are controlled by a shift control module 1002, which provides the bit-shift structures with configuration parameters $n_1$, $n_2$, and $n_3$ according to the used modulation scheme. In an embodiment, the shift control module 1002 receives QAM 908 signal from the receiver control module of the soft-output demapper.

As a result, the number of operations (summations, absolute value calculations) within the soft-slicer is reduced. Further, the embodiment of FIG. 10 allows for the aggregation of computation branches within the soft-slicer among the various modulation schemes. Note, for example, that in FIG. 9, 16-QAM, 64-QAM, and 256-QAM have each a separate computation branch for $\Lambda_{R,1}$, but that a single $\Lambda_{R,1}$ computation branch exists in FIG. 10 for all modulation schemes. As such, output multiplexer 918 only needs to ensure that the correct number of soft-bits is output (i.e., 1 in BPSK, 2 in QPSK, 4 in 16-QAM, 6 in 64-QAM, and 8 in 256-QAM).

FIG. 11 illustrates exemplary control signals for configuring soft-slicer 1000 of FIG. 10. The control signals are modulation-dependent and include K constants, bit shift control signals, and read out control signals.

Figure 12:
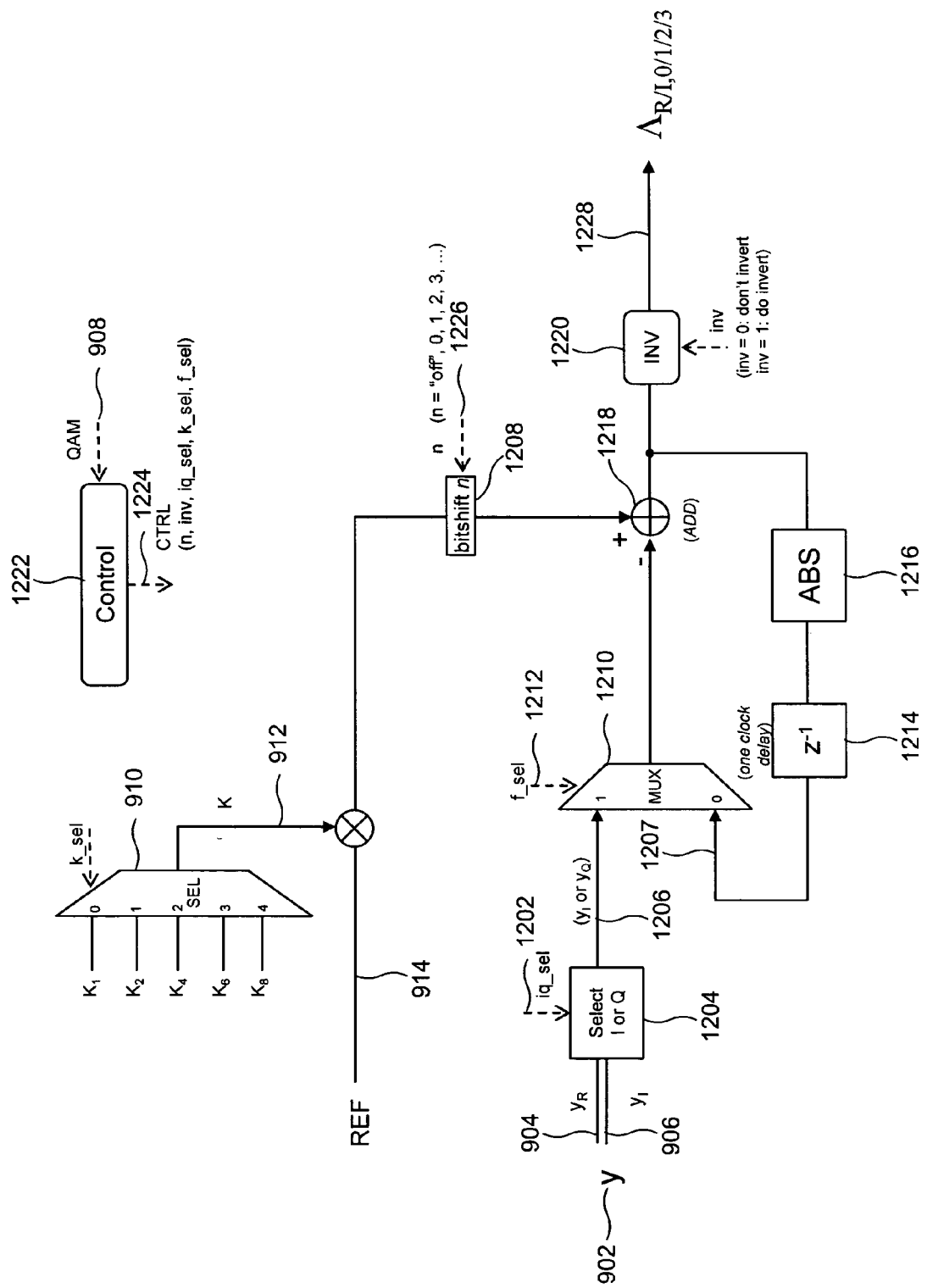
FIG. 12 illustrates another configurable soft-slicer according to an embodiment of the present invention.

FIG. 12 illustrates a configurable soft-slicer 1200 according to another embodiment of the present invention. Soft-slicer 1200 exploits the recursive nature of the soft-output demapping equations of FIG. 8 to implement a serial computation of preliminary L-values for a given modulation scheme.

In an embodiment, soft-slicer 1200 employs a feedback loop including an absolute value calculation module 1216 and a delay structure 1214 to successively compute soft-bits. Soft-slicer 1200 further includes an I/Q select module 1204 to select the real part 904 or the imaginary part 906 of the received equalized signal y 902. The I/Q select module 1204 is controlled by an IQ select signal 1202. The feedback loop and the output 1206 of the I/Q select module 1204 are input into a multiplexer 1210. Multiplexer 1210 is controlled by a control signal f_sel 1212, which determines which of the two inputs of multiplexer 1210 is output at each clock cycle.

Similar to above described soft-slicer embodiments 900 and 1000, soft-slicer embodiment 1200 includes a multiplexer 910 that outputs the modulation-dependent constant K 912. The constant K 912 is multiplied by mode-dependent signal REF 114, with the product further multiplied by a factor of 2, according to the modulation scheme. The factor of 2 multiplication is implemented using a bit-shift structure 1208, which is controlled by a control signal n 1226.

The output of multiplexer 1210 is subtracted from the output of bit-shift structure 1208 to generate soft-bit values 1228. For certain soft-bits, a sign inversion operation is optionally performed using inverter 1220. It is noted that in FIG. 12, a single soft-slicing structure is provided to process both the real and imaginary parts of the received equalized signal y 902. In other embodiments, the structure of FIG. 12 can be duplicated for simultaneous processing of the real and imaginary parts of y 902, resulting in faster generation of soft-bits 1228.

In an embodiment, a control module 1222 is used to provide soft-slicer 1200, at each clock cycle, with the required control parameters (n, inv, iq_sel, k_sel, and f_sel) based on the used modulation scheme. FIG. 13 illustrates an exemplary (time) configuration of control parameters of soft-slicer 1200, for various modulation schemes. It is noted that at the beginning of demapping of the first bit on both the real and imaginary parts of y 902, delay structure 1214 is reset to zero. In other words, delay structure 1214 is reset to zero before clock cycle c=0 for all modulation schemes. Further, a reset of delay structure 1214 is performed just before c=2 in 16-QAM, just before c=3 in 64-QAM, and just before c=4 in 256-QAM. Also, note that when parameter n is set be "off", no signal should be injected to the feedback loop. In practice, this can be achieved by disabling the output of bit-shift structure 1208 (i.e., setting the output to constant 0) and having a separate "enable/disable" signal instead of encoding the request to generate an all-zeros output.

B. Post-Scaler

The re-configurable soft-output demapper optionally includes a plurality of mode/modulation-agnostic post-scalers. In FIG. 7, the post-scalers are illustrated as soft-output demapper elements 730 and 732.

Figure 14:
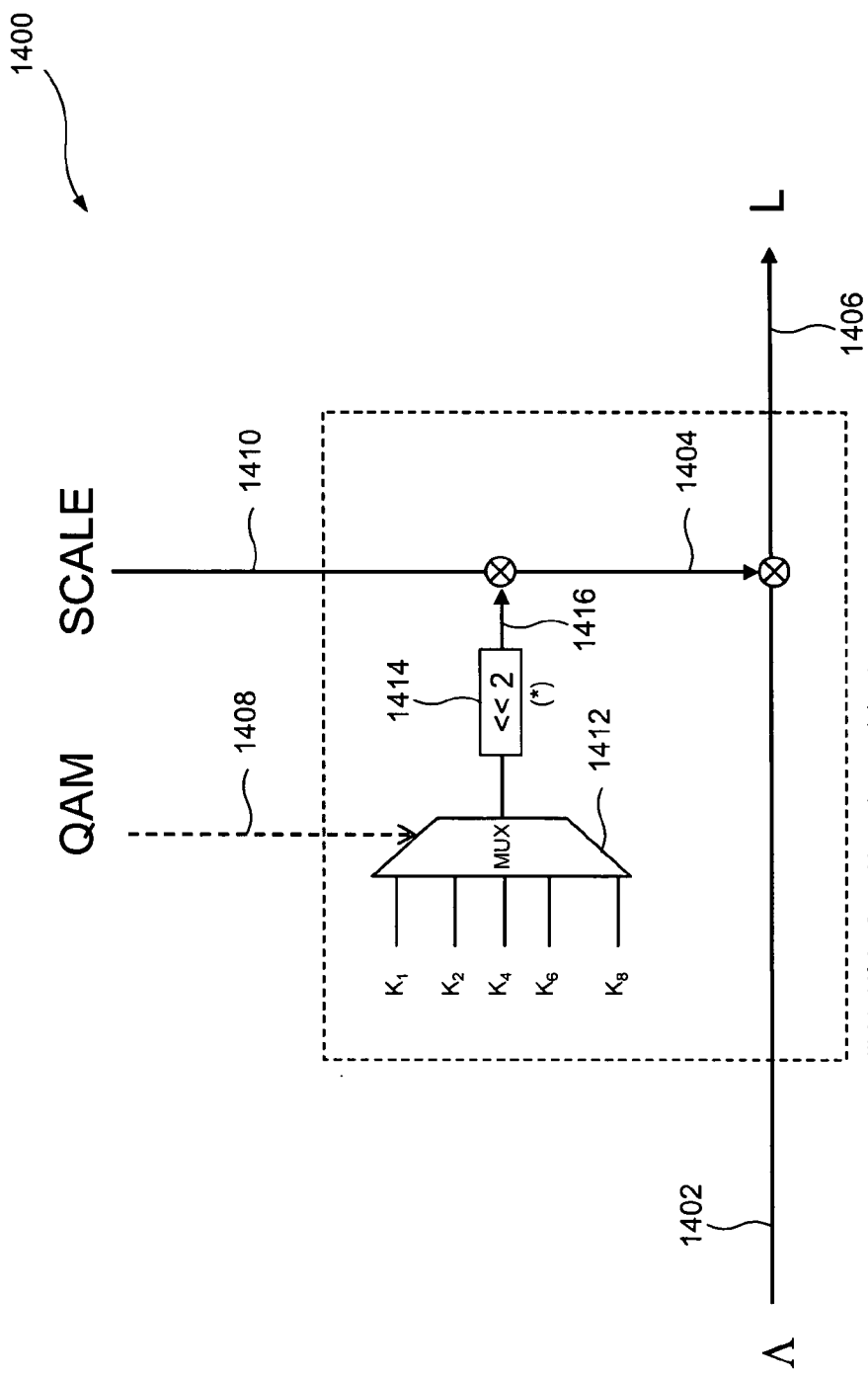
FIG. 14 illustrates a post-scaler according to an embodiment of the present invention.

FIG. 14 illustrates an exemplary post-scaler implementation 1400 according to an embodiment of the present invention. As described above, the function of a post-scaler is to scale the soft-bits generated by the soft-slicer to account for varying signal-to-noise ratio (SNR) conditions at the receiver.

Post-scaler 1400 receives a soft-bit value A 1402 from a soft-slicer. The soft-bit value 1402 is multiplied by mode/modulation dependent factor 1404 to generate a final L-value 1406.

In an embodiment, the mode/modulation dependent factor 1404 is generated by multiplying a scaling constant SCALE 1410 provided by the coefficient calculator (not shown in FIG. 14) and a modulation dependent constant 1416. The scaling constant 1410 is related to signal-to-noise ratio (SNR) conditions at the receiver. In an embodiment, the modulation dependent constant 1416 is generated by bit-shifting a factor K output by a multiplexer 1412 of post-scaler 1400. In an embodiment, multiplexer 1412 receives as input a number of modulation dependent constants and outputs a particular constant according to the used modulation scheme. In an embodiment, multiplexer 1412 is controlled by a QAM 1408 signal provided by the receiver control module of the soft-output demapper.

In an embodiment, post-scaler 1400 performs the following equation:

$$L = A * SCALE * 4 * K \quad (4)$$

where L is the final L-value and A is the received soft-bit value. Note that the constant scaling by 4 is selected according to numerical range considerations of the final L-values and that other scaling constants may also be used.

Figure 15:
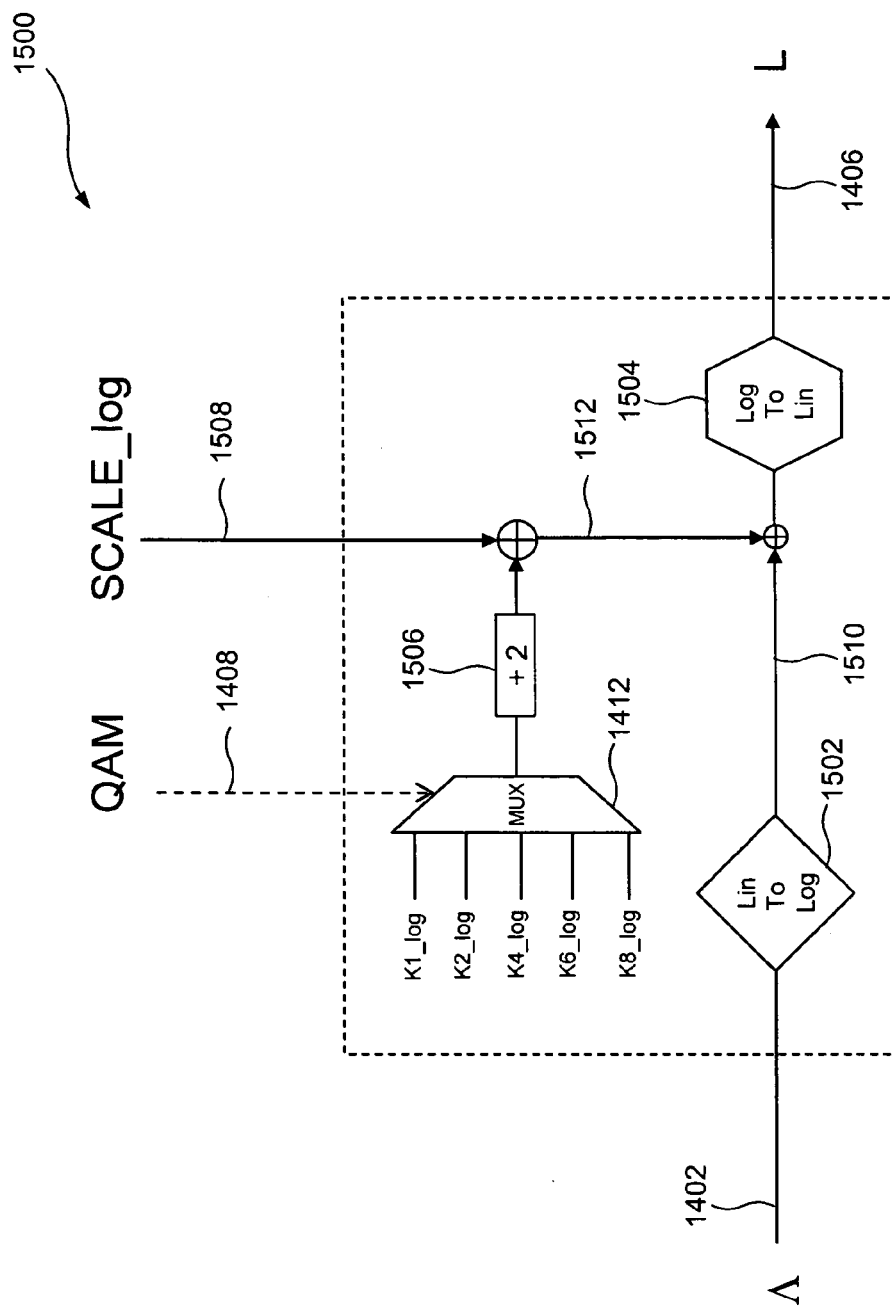
FIG. 15 illustrates another post-scaler according to an embodiment of the present invention.

FIG. 15 illustrates another post-scaler implementation 1500. The post-scaler implementation 1500 is a log domain-equivalent of implementation 1400 of FIG. 14. Note that multiplication operations in the embodiment of FIG. 14 are replaced with addition operations in the embodiment of FIG. 15. This is the case because multiplications performed in a linear domain are functionally equivalent to additions performed in a logarithmic domain.

A received soft-bit value 1402 can be transformed into the log domain using a linear to log transformer 1502, to generate a log soft-bit value 1510. Subsequently, the generated log soft-bit value 1510 is summed with a mode/modulation dependent factor 1512, with the summation result transformed back to the linear domain (using log to linear transformer 1504) to generate the final L-value 1406.

It is noted that in log implementation 1500, the scaling constant 1508 provided by the coefficient calculator and inputs into multiplexer 1412 are provided in the log domain. Further, note that the bitshift operation performed in implementation 1400 using bitshift structure 1414 is replaced with an addition operation of a constant.

C. Equalizer

The re-configurable soft-output demapper includes a mode/modulation-agnostic equalizer. In FIG. 7, the equalizer is illustrated using soft-output demapper element 702.

As described above, the function of the equalizer is to pre-process received streams according to a weight matrix provided by the coefficient calculator of the demapper. The weight matrix is typically generated using a channel response matrix and noise variances associated with the received streams. As a result, the equalized streams are corrected for any channel effects, such as rotation and scaling, and noise effects such as translation.

Figure 16:
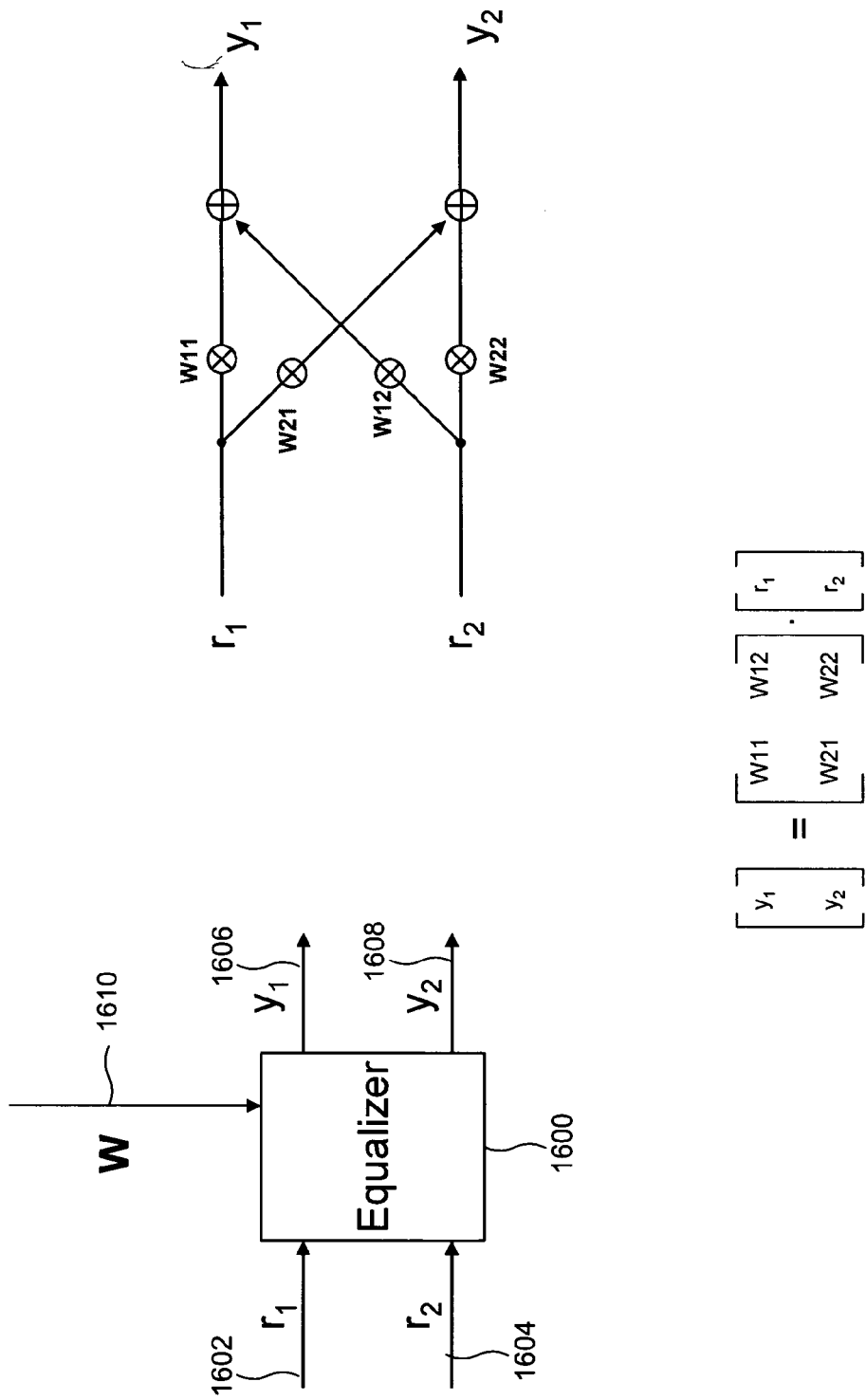
FIG. 16 illustrates an equalizer according to an embodiment of the present invention.

FIG. 16 illustrates an exemplary equalizer 1600. As illustrated, the equalizer 1600 receives a plurality of streams $r_1$ 1602 and $r_2$ 1604 and a weight matrix W 1610 and outputs a plurality of corresponding equalized streams $y_1$ 1606 and $y_2$ 1608. As would be understood by a person skilled in the art, equalizer 1600 illustrates a 2 receive antennas case but can be readily extend to a more general m receive antennas SIMO or MIMO case.

FIG. 16 further illustrates the matrix multiplication operation performed in equalizer 1600, which includes a multiplication of weight matrix W and a vector of received streams [$r_1$ $r_2$] to generate a vector of equalized streams [$y_1$ $y_2$]. Note for a single receive antenna case, the matrix multiplication reduces to scalar multiplication. Also it is noted that the number of received streams at the equalizer is equal to the number of receive antennas at the receiver and that the number of equalized streams generated by the equalizer is equal to the number of transmitted streams by the transmitter.

D. Coefficient Calculator

The re-configurable soft-output demapper includes a coefficient calculator to configure elements of the demapper according to the modulation scheme and the mode of operation. In FIG. 7, the coefficient calculator is illustrated as element 712 of the soft-output demapper.

Figure 17:
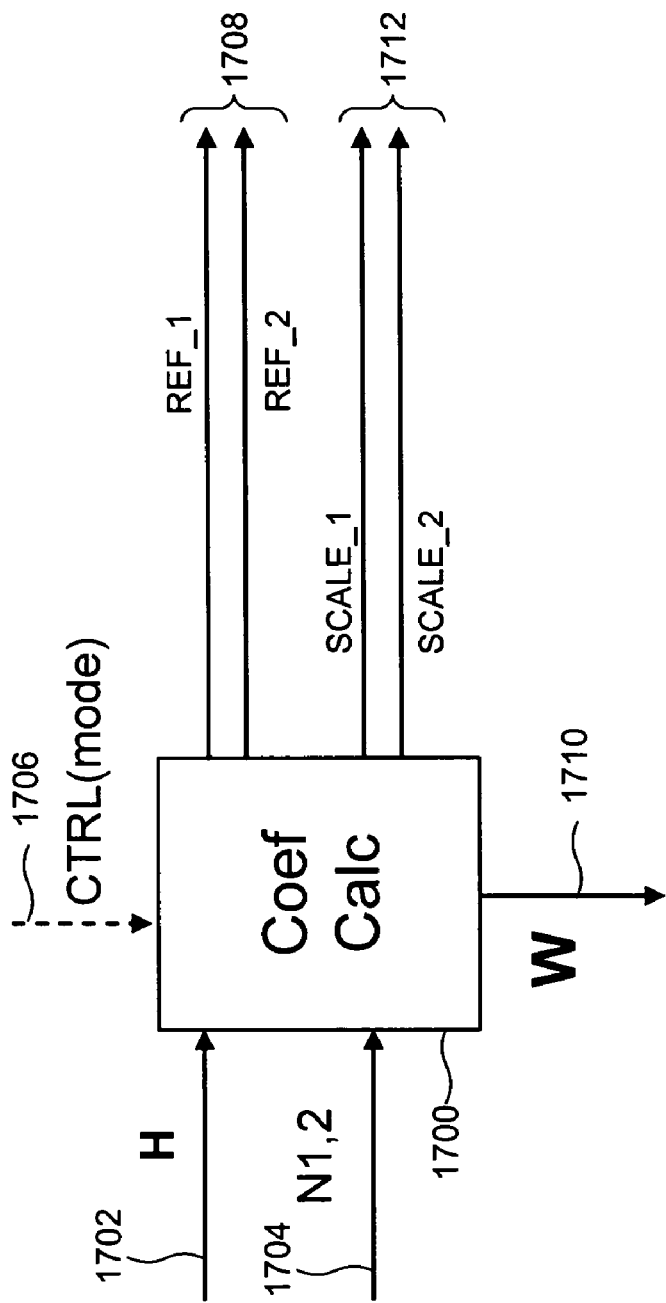
FIG. 17 illustrates a coefficient calculator according to an embodiment of the present invention.

FIG. 17 illustrates a coefficient calculator 1700 according to an embodiment of the present invention. In an embodiment, coefficient calculator 1700 receives a channel response matrix estimate H 1702 and noise variances 1704 for each receive branch of the receiver. Further, coefficient calculator 1700 receives a control signal CTRL 1704 for the receiver control module of the receiver, which indicates to the coefficient calculator the mode of operation (SISO, SIMO, MIMO) and the used modulation scheme.

Based on these received inputs, coefficient calculator 1700 calculates a number of configuration parameters including a plurality of mode-dependent parameters 1708 (REF_1 and REF_2 in FIG. 17) for configuring the soft-slicers, a plurality of scaling factors 1712 (SCALE_1 and SCALE_2 in FIG. 17) used by the post-scalers, and a weight matrix W 1710 used by the equalizer.

The coefficient calculator enables the equalizer to accommodate multiple transmit/receive modes of operation, including, without limitation, a single transmit antenna and a single receive antenna, a single transmit antenna and multiple receive antennas, and multiple transmit antennas and multiple receive antennas. Similarly, the coefficient calculator 102 enables the slicers to accommodate multiple modulation schemes including, without limitation, BPSK, QPSK, and QAM.

Note that for a given mode of operation, there is generally a number of valid parameterizations for the equalizer, the soft-slicers, and the post-scalers to generate desired L-values at the output of the soft-output demapper. It is desirable to employ configurations which exhibit good numerical properties, allowing for a compact and cost-efficient hardware implementation. One criterion relates to the dynamic range of signals, in that the range of values generated by the soft-output demapper for any received signals should be representable without significant loss of accuracy using a fixed-point representation. Accordingly, the coefficient calculator should ensure a finite dynamic range of generated values across all modes of operation, modulation schemes, and channel and noise conditions.

In the following, a number of exemplary parameterization configurations for different modes of operations are provided. It is noted that these configurations are provided for the purpose of illustration and are not limiting. Other configurations may also be implemented.

Figure 18:
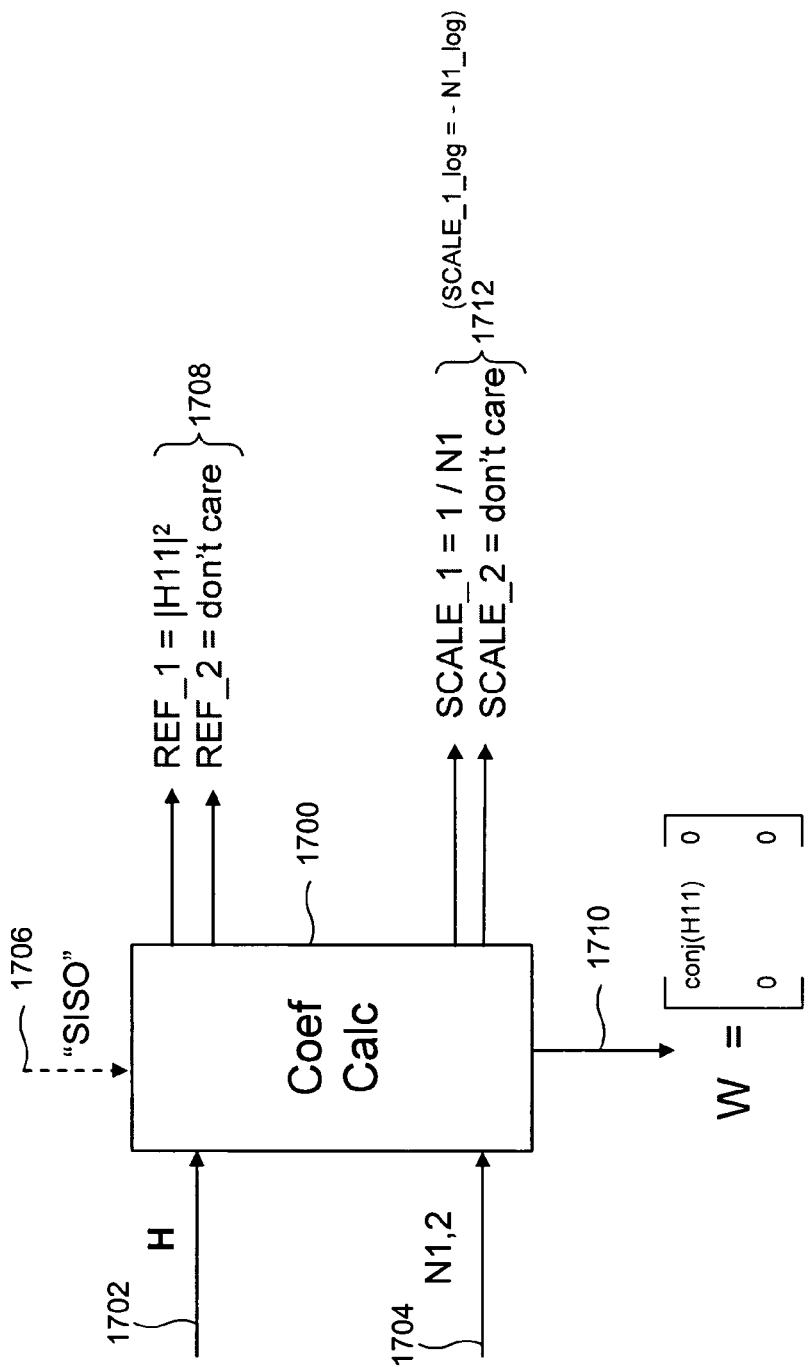
FIG. 18 illustrates an exemplary SISO parameterization configuration.

FIG. 18 illustrates an exemplary parameterization configuration for a SISO mode of operation. It is noted that in this mode of operation, signal 1704 that provides noise variance information to the coefficient calculator includes information of a single receive branch. Further, since this mode of operation includes a single transmit antenna and a single receive antenna, the weight matrix W 1710 includes a single nonzero entry.

The coefficient calculator outputs a single mode-dependent REF_1 1708 signal and a single scaling factor SCALE_1 1712, with values as illustrated in FIG. 18 according to this particular exemplary configuration. This is the case because with a single received stream, a single post-slicer and single post-scaler is used.

FIG. 19 illustrates exemplary parameterization configurations for a SIMO mode of operation. In these exemplary configurations, a case with two receive antennas is assumed. This, however, can be readily extended to a more general SIMO case with any number of receive antennas, as would be appreciated by a person skilled in the art based on the teachings herein.

It is noted that since a single transmit stream is present, only weights $W_{11}$ and $W_{12}$ of weight matrix W are relevant in these exemplary configurations. Similarly, since a single post-slicer and a single post-scaler are used for a single transmit stream, a single mode-dependent parameter REF_1 and a single scaling factor SCALE_1 need to be calculated by the coefficient calculator.

FIG. 19 provides a first (Option #1) and a second (Option #2) exemplary configuration, with either providing a valid parameterization of the soft-output demapper. The choice between either configuration may depend on the complexity of the solution and/or numerical properties of the overall soft-output demapper. Other hybrid parameterizations may use both the first and second configurations.

The following exemplary parameterizations may be used using the first and second exemplary configurations of FIG. 19:

A) always use Option #1.
B) always use Option #2.
C) use Option #1 whenever $N_2 > N_1$, otherwise use Option #2.
D) use Option #1 whenever $N_1 > N_2$, otherwise use Option #2.
E) use Option #1 whenever $(N_2/N_1)|H_{11}|^2 > (N_1/N_2)|H_{21}|^2$, otherwise use Option #2.
F) use Option #1 whenever $(N_1/N_2)|H_{21}|^2 > (N_2/N_1)|H_{11}|^2$, otherwise use Option #2.

Note that in all of above listed parameterizations, replacing the ">" sign (larger than) by a ">=" sign (larger than or equal) also results in useful parameterizations that exhibit good performance in practice. Also note that in parameterizations C) through F), the choice between Option #1 and Option #2 is performed at run-time (e.g., as soon the channel coefficients $H_{11}$ and $H_{21}$ and the noise variances $N_1$ and $N_2$ become available).

FIG. 20 illustrates an exemplary MIMO parameterization configuration. In this exemplary configuration, a case with two transmit antennas and two receive antennas is assumed. This, however, can be readily extended to a more general MIMO case with any number of transmit/receive antennas, as would be appreciated by a person skilled in the art based on the teachings herein.

It is noted that various terms of the exemplary configuration of FIG. 20 require the computation of the term $|H_{det}|=|H_{11}H_{22}-H_{21}H_{12}|$. An efficient implementation of portions of the coefficient calculator using CORDIC structures is provided below with respect to FIG. 21. It is also noted that the computation of scaling factors SCALE_1 and SCALE_2 requires division operations, which may be more efficiently implemented in the logarithmic domain. In such implementation, the coefficient calculator calculates in the logarithmic domain the numerator $|H_{det}|$ of factors SCALE_1 and SCALE_1 as well as the denominator terms of these factors as illustrated in FIG. 20. The logarithmic domain values of the factors SCALE_1 and SCALE_2 can then be computed as follows:

$$\text{SCALE\_1} = \log(|H_{det}|) - \log(N_1|H_{22}|^2 + N_2|H_{12}|^2),$$

$$\text{SCALE\_2} = \log(|H_{det}|) - \log(N_1|H_{21}|^2 + N_2|H_{11}|^2)$$

where typically the log operation is performed as a base-2 log.

Figure 21:
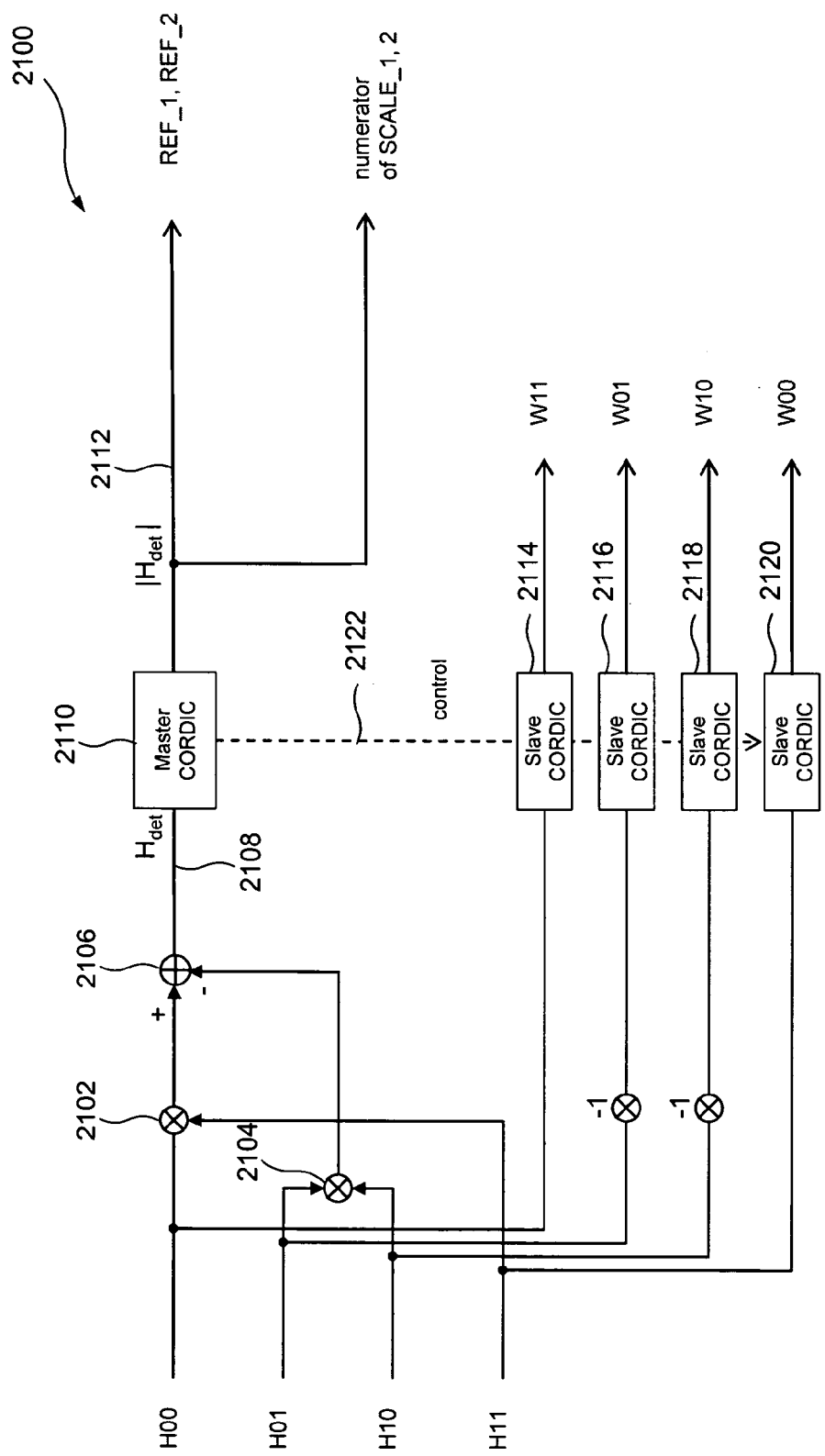
FIG. 21 illustrates an exemplary MIMO coefficient calculator implementation.

FIG. 21 illustrates an exemplary MIMO coefficient calculator implementation 2100. It is noted that implementation 2100 illustrates the portions of the MIMO coefficient calculator that compute REF_1, REF_2, the weight matrix W, and the numerator of the scaling factors SCALE_1 and SCALE_2. The portions of the coefficient calculator that compute the denominators of scaling factors SCALE_1 and SCALE_2 are not illustrated in FIG. 21. It is also noted that channel response coefficients $H_{00}$, $H_{01}$, $H_{10}$, and $H_{11}$ in FIG. 21 correspond respectively to channel coefficients $H_{11}$, $H_{12}$, $H_{21}$, and $H_{22}$ in FIG. 20. Similarly, weight coefficients $W_{00}$, $W_{01}$, $W_{10}$, and $W_{11}$ correspond respectively to weight coefficients $W_{11}$, $W_{12}$, $W_{21}$, and $W_{22}$ of channel matrix W of FIG. 20.

According to implementation 2100, a determinant $H_{det}$ 2108 of channel response matrix H is computed using multipliers 2102 and 2104 and a summer 2106 from received channel coefficients $H_{00}$, $H_{01}$, $H_{10}$, and $H_{11}$. Subsequently, a master CORDIC structure 2110 is used to generate the absolute value $|H_{det}|$ 2112 of the determinant $H_{det}$ 2108. Typically, the master CORDIC structure 2110 performs iterative rotations in complex space on the complex-valued $H_{det}$ 2108 until its complex part is substantially equal to zero, resulting in a real-only value equal to the absolute value of $H_{det}$ 2108. Concurrently, iterative phase rotations are applied on channel coefficients $H_{00}$, $H_{01}$, $H_{10}$, and $H_{11}$ using Slave CORDIC structures 2114, 2116, 2118, and 2120 to generate weight coefficients $W_{00}$, $W_{01}$, $W_{10}$, and $W_{11}$. Note that the overall phase rotation applied to $H_{det}$ 2108 is equal to the overall phase rotation applied to each of channel coefficients $H_{00}$, $H_{01}$, $H_{10}$, and $H_{11}$. This is highlighted by the Master-Slave relationship between CORDIC structure 2110 and CORDIC structures 2114, 2116, 2118, and 2120, with Master CORDIC structure 2110 controlling Slave CORDIC structures 2114, 2116, 2118, and 2120 using a control signal 2122.

Above, a number of various parameterization configurations have been provided for various modes of operation. While other valid configurations are possible, the above described configurations are characterized by a relatively low dynamic range for all signals. As illustrated in FIG. 18, for example, the weight coefficient $W_{11}$ is given by $H_{11}^*$. Similarly, for the two SIMO options of FIG. 19, $W_{11}$ is given by either the same value or a scaled version thereof. Accordingly, $W_{11}$ exhibits a linear dependency on a channel coefficient. The same applies for the other weight coefficients of weight matrix W. Note that phase rotation does not change the absolute value of the weights, and hence does not affect their dynamic range. Therefore, in all three modes of operation, the weight coefficients are linear functions of a channel coefficient, limiting the numerical range of the equalizer outputs to the ranges of its input signals multiplied by an expression that is linearly proportional to a channel coefficient.

IV. CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like and combinations thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A soft-output bit demapper system reconfigurable for multiple modes of operations and multiples modulation schemes, comprising:
   a mode/modulation-independent equalizer;
   a plurality of mode/modulation-independent soft-bit slicers coupled to the equalizer; and
   a coefficient calculator coupled to the equalizer and the plurality of soft-bit slicers;

wherein the coefficient calculator is configured to provide configuration parameters to the equalizer and the plurality of soft-bit slicers according to a desired mode of operation and modulation scheme.

2. The system according to claim 1, further comprising a plurality of post-scalers, each post-scaler coupled to a corresponding one of the soft-bit slicers, wherein the coefficient calculator is configured to provide configuration parameters to each of the plurality of post-scalers.

3. The system according to claim 1, wherein the coefficient calculator enables the equalizer to accommodate a plurality of the following transmit/receive antenna modes of operations:
a single transmit antenna and a single receive antenna;
a single transmit antenna and multiple receive antennas; and
multiple transmit antennas and multiple receive antennas.

4. The system according to claim 1, wherein the coefficient calculator provides the equalizer with a weight matrix W, said weight matrix containing weight coefficients used by the equalizer to process received streams.

5. The system according to claim 4, wherein the equalizer processes the received streams to remove channel and noise effects from said received streams due to channel transmission and receiver noise.

6. The system according to claim 1, wherein the coefficient calculator enables the soft-bit slicers to accommodate one or more of the following modulation schemes:
BPSK,
QPSK, and
QAM.

7. The system according to claim 1, wherein the coefficient calculator provides the soft-bit slicers with mode-related configuration parameters.

8. The system according to claim 1, wherein the soft-bit slicers receive modulation-related configuration parameters from a receiver control module.

9. The system according to claim 1, wherein the soft-bit slicers receive equalized streams from the equalizer and generate soft-bit values using said equalized streams.

10. The system according to claim 2, wherein the post-scalers receive preliminary soft-bit values generated by the soft-slicers and generates final soft-bit values.

11. The system according to claim 10, wherein the post-scalers are configured to receive scaling factors from the coefficient calculator, said scaling factors used by the post-scalers to scale the received preliminary soft-bit values, thereby ensuring that the generated final soft-bit values have uniform dynamic ranges for all modes of operation and all signal-to-noise ratio (SNR) conditions at receiver branches.

12. The system according to claim 11, wherein said scaling factors are generated by the coefficient calculator using received noise variance information.

13. The system according to claim 2, wherein the post-scalers are configured to receive modulation-related configuration parameters from a receiver control module.

14. The system according to claim 1, wherein the coefficient calculator is configured to receive a channel response estimate matrix, said channel response estimate matrix including channel coefficients between transmit and receive antennas.

15. The system according to claim 9, wherein the soft-bit slicers perform iterative soft-bit slicing, wherein soft-bit values generated for certain bits are used in soft-bit slicing of subsequent bits.

16. The system according to claim 9, wherein the soft-bit slicers implement maximum likelihood soft-slicing.

17. The system according to claim 9, wherein the soft-bit slicers perform soft-slicing according to the following for BPSK modulation:

$$\Lambda_{R,0} = y_R,$$

where $\Lambda_{R,0}$ is a preliminary soft-bit value for a BPSK-modulated transmitted data symbol and $y_R$ is the real part of a received equalized stream corresponding to said transmitted data symbol.

18. The system according to claim 9, wherein the soft-bit slicers perform soft-slicing according to the following for QPSK modulation:

$$\Lambda_{R,0} = y_R$$

$$\Lambda_{I,0} = y_I$$

where $\Lambda_{R,0}$ and $\Lambda_{I,0}$ are respectively preliminary soft-bit values for the first and second bits in a QPSK-modulated transmitted data symbol and $y_R$ and $y_I$ are respectively the real and imaginary parts of a received equalized stream corresponding to said transmitted data symbol.

19. The system according to claim 9, wherein the soft-bit slicers perform soft-slicing according to the following for 16-QAM modulation:

$$\Lambda_{R,0} = y_R$$

$$\Lambda_{R,1} = 2 \cdot (REF*K) - |\Lambda_{R,0}|$$

$$\Lambda_{I,0} = y_I$$

$$\Lambda_{I,1} = 2 \cdot (REF*K) - |\Lambda_{I,0}|$$

where $\Lambda_{R,0}, \Lambda_{R,1}, \Lambda_{I,0}, \Lambda_{I,1}$ are respectively preliminary soft-bit values for the first, second, third, and fourth bits in a 16-QAM-modulated transmitted data symbol, $y_R$ and $y_I$ are respectively the real and imaginary parts of a receive equalized stream corresponding to said transmitted data symbol, REF is a mode-dependent constant, and K a modulation-dependent constant.

20. The system according to claim 9, wherein the soft-bit slicers perform soft-slicing according to the following for 64-QAM modulation:

$$\Lambda_{R,0} = y_R$$

$$\Lambda_{R,1} = 4 \cdot (REF*K) - |\Lambda_{R,0}|$$

$$\Lambda_{R,2} = 2 \cdot (REF*K) - |\Lambda_{R,1}|$$

$$\Lambda_{I,0} = y_I$$

$$\Lambda_{I,1} = 4 \cdot (REF*K) - |\Lambda_{I,0}|$$

$$\Lambda_{I,2} = 2 \cdot (REF*K) - |\Lambda_{I,1}|$$

where $\Lambda_{R,0}, \Lambda_{R,1}, \Lambda_{R,2}, \Lambda_{I,0}, \Lambda_{I,1}, \Lambda_{I,2}$ are respectively preliminary soft-bit values for the first, second, third, fourth, fifth, and sixth bits in a 64-QAM-modulated transmitted data symbol, $y_R$ and $y_I$ are respectively the real and imaginary parts of a receive equalized stream corresponding to said transmitted data symbol, REF is a mode-dependent constant, and K a modulation-dependent constant.

21. The system according to claim 9, wherein the soft-bit slicers perform soft-slicing according to the following for 256-QAM modulation:

$$\Lambda_{R,0} = y_R$$

$$\Lambda_{R,1} = 8 \cdot (REF*K) - |\Lambda_{R,0}|$$

$$\Lambda_{R,2} = 4 \cdot (REF*K) - |\Lambda_{R,1}|$$

$\Lambda_{R,3} = 2 \cdot (REF*K) - |\Lambda_{R,2}|$ $\Lambda_{I,0} = y_I$ $\Lambda_{I,1} = 8 \cdot (REF*K) - |\Lambda_{I,0}|$ $\Lambda_{I,2} = 4 \cdot (REF*K) - |\Lambda_{I,1}|$ $\Lambda_{I,3} = 2 \cdot (REF*K) - |\Lambda_{I,2}|$ where $\Lambda_{R,0}, \Lambda_{R,1}, \Lambda_{R,2}, \Lambda_{R,3}, \Lambda_{I,0}, \Lambda_{I,1}, \Lambda_{I,2}, \Lambda_{I,3}$ are respectively preliminary soft-bit values for the first, second, third, fourth, fifth, sixth, seventh, and eighth bits in a 256-QAM-modulated transmitted data symbol, $y_R$ and $y_I$ are respectively the real and imaginary parts of a receive equalized stream corresponding to said transmitted data symbol, REF is a mode-dependent constant, and K a modulation-dependent constant.

22. The system of claim 10, wherein the post-scalers implement the following equation for generating final soft-bit values from preliminary soft-bit values:

$L = \Lambda * \text{SCALE} * 4 * K,$ where L is a final soft-bit value corresponding to a bit in a received data symbol, $\Lambda$ is a preliminary L-value received from a soft-slicer, SCALE is a scaling factor received from the coefficient calculator, and K is a modulation-dependent constant.

23. The system of claim 22, wherein at least a portion of the equation implemented by the post-scalers is performed in a logarithmic domain.

* * * * *